(12) United States Patent
Takashima et al.

(10) Patent No.: US 6,462,151 B1
(45) Date of Patent: Oct. 8, 2002

(54) METHOD OF REMOVING AND RECOVERING BORON TRIFLUORIDE WITH METAL FLUORIDE AND PROCESS FOR POLYOLEFIN PRODUCTION USING THE SAME

(75) Inventors: Tsutomu Takashima, Kawasaki; Yuichi Tokumoto, Chigasaki; Koji Fujimura, Kisarazu, all of (JP)

(73) Assignee: Nippon Petrochemicals Company, Limited, Tokyo (JP)

( * ) Notice: Subject to any disclaimer, the term of this patent is extended or adjusted under 35 U.S.C. 154(b) by 0 days.

(21) Appl. No.: 09/582,242

(22) PCT Filed: Oct. 29, 1999

(86) PCT No.: PCT/JP99/06020

§ 371 (c)(1),
(2), (4) Date: Jun. 22, 2000

(87) PCT Pub. No.: WO00/26261

PCT Pub. Date: May 11, 2000

(30) Foreign Application Priority Data

Oct. 29, 1998 (JP) .......................................... 10-324527
Oct. 29, 1998 (JP) .......................................... 10-324528
Oct. 29, 1998 (JP) .......................................... 10-324529
Mar. 10, 1999 (JP) .......................................... 11-062607
Mar. 10, 1999 (JP) .......................................... 11-062899

(51) Int. Cl.$^7$ ................................................. C08F 2/00
(52) U.S. Cl. ........................ 526/69; 208/262.1; 585/525; 585/521; 585/520; 585/504; 526/133; 526/131; 526/348

(58) Field of Search ................... 208/262.1; 585/504, 585/525, 521, 520; 526/133, 131, 69, 348

(56) References Cited

U.S. PATENT DOCUMENTS 4,981,578 A * 1/1991 Tycer et al. ............. 208/262.1
5,811,616 A    9/1998 Holub et al.

FOREIGN PATENT DOCUMENTS

| EP | 0 349 276 A2 | 1/1990 |
| JP | 49-99587 | 9/1974 |
| JP | 3-31312 | 2/1991 |

* cited by examiner

*Primary Examiner*—David W. Wu
*Assistant Examiner*—Ling-Siu Choi
(74) *Attorney, Agent, or Firm*—Hollander Law Firm, P.L.C.

(57) ABSTRACT

Boron trifluoride can be recovered in a reusable state by a method that is economical and does not cause environmental pollution, which method comprises the steps of bringing a fluid containing boron trifluoride or its complex into contact with metal fluoride so as to selectively adsorb and remove boron trifluoride in the complex and heating the resultant metal tetrafluoroborate at a temperature in the range of 100 to 600° C. to separate it into boron trifluoride and metal fluoride. By applying the method to a process for producing polybutene or olefin oligomer using boron trifluoride complex catalyst, the catalyst can be recovered with retaining its activity and reused effectively.

8 Claims, 1 Drawing Sheet

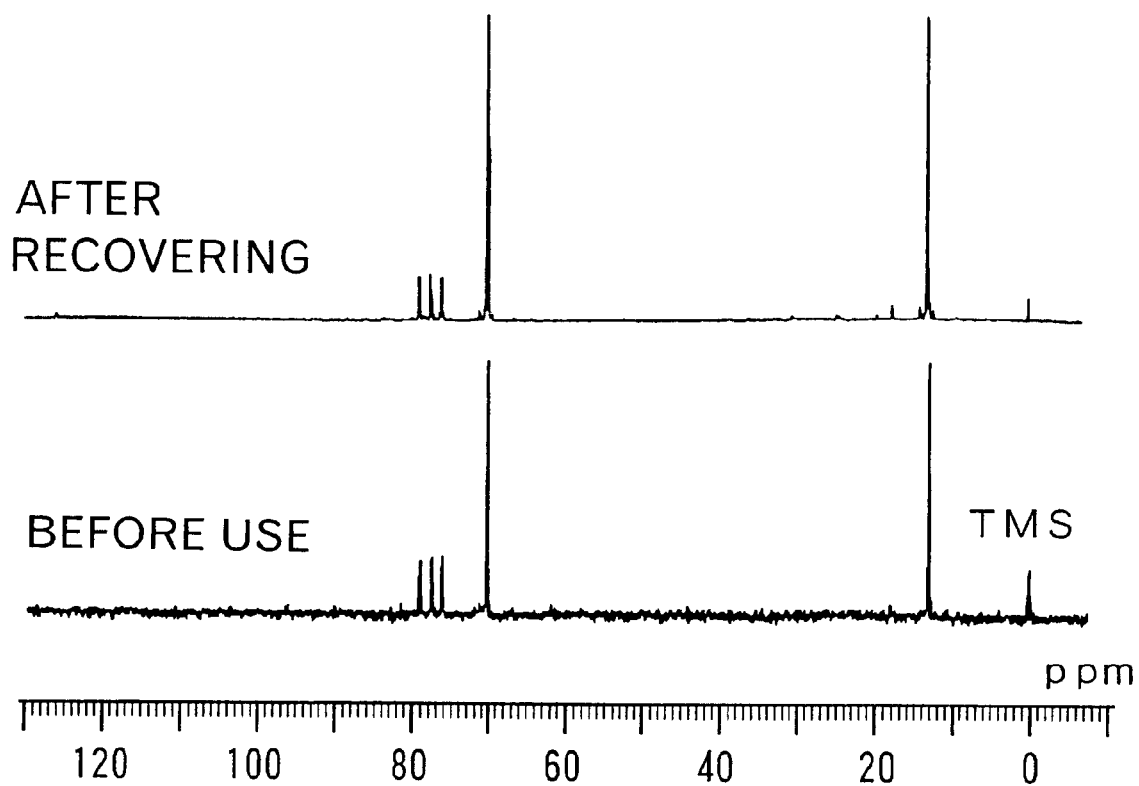

METHOD OF REMOVING AND RECOVERING BORON TRIFLUORIDE WITH METAL FLUORIDE AND PROCESS FOR POLYOLEFIN PRODUCTION USING THE SAME

TECHNICAL FIELD

The present invention relates to a method for separating and removing selectively boron trifluoride from a fluid containing boron trifluoride or its complex and a method for recovering the boron trifluoride.

Furthermore, the present invention relates to a method for producing polyolefin using a boron trifluoride complex catalyst, as polymerization catalyst, comprising boron trifluoride and a complexing agent. More particularly, the invention relates to a method in which a polymerization product containing polybutene or olefin oligomer obtained by olefin polymerization is brought into contact with metal fluoride to remove boron trifluoride recovering the complexing agent from the complex catalyst. Furthermore, it relates to a method comprising the steps of heating the produced metal tetrafluoroborate so as to separate metal fluoride and boron trifluoride gas, and reproducing boron trifluoride complex catalyst for reuse from the recovered boron trifluoride and the complexing agent.

BACKGROUND ART

Boron trifluoride and boron trifluoride complex composed of boron trifluoride and a complexing agent (also called as "ligand") are used widely in industrial fields as catalysts in various chemical reactions such as alkylation, isomerization, polymerization, decomposition and dehydration. These catalysts are used in the form of boron trifluoride alone or in the form of coordination compound containing any of various complexing agents in an appropriate proportion relative to boron trifluoride in accordance with an intended reaction.

After the termination of reaction using boron trifluoride catalyst or its complex catalyst, it is necessary to deactivate the boron trifluoride.

For this purpose, the catalyst is usually neutralized in an aqueous solution of basic substance such as ammonia, caustic soda or lime, then it is washed with water. However, the catalyst treated in such a method cannot be used again. Furthermore, waste liquid containing the used alkali and fluoride as the neutralization product of boron trifluoride, is discarded from the processes of neutralization and washing. In recent years, therefore, it has been demanded to take measures to deal with the problem in environmental pollution. Still further, because boron trifluoride is expensive in itself, its recovering and reusing are advantageous in the viewpoints of economy and environmental protection. Therefore, various kinds of recovering methods have hitherto been proposed.

In the following, a process for producing polybutene and olefin oligomer using boron trifluoride complex will be described.

Polymers having double bond structure of vinylidene groups are especially useful in that they can react with maleic acid or the like at high rate. Therefore, some processes are proposed for introducing much more vinylidene structures into polybutene.

For example, in U.S. Pat. No. 4,152,499, it is disclosed that isobutene is polymerized using, as polymerization catalyst, gaseous boron trifluoride or a boron trifluoride complex catalyst with complexing agent of water or alcohol. In this case, isobutene is polymerized in the temperature range of −50° C. to +30° C., and polyisobutene having a polymerization degree of 10 to 100 is obtained. It is described in this reference that vinylidene double bonds can be introduced into 60 to 90% of terminal positions.

Furthermore, in European Patent No. 0 145 235 A, it is disclosed that polymerization was carried out using a complex catalyst previously prepared from boron trifluoride and $C_1$ to $C_8$ alcohols, and vinylidene double bond could be introduced into 70 to 90% of terminal positions of polyisobutene.

As described above, boron trifluoride complex catalysts are often used for producing polybutene such as polyisobutene. For each complex catalyst, specific complexing agent is selected, and its molar coordination number is also specified.

Concerning olefin oligomers, processes for producing olefin oligomer by polymerizing olefins having 6 to 18 carbon atoms are widely known. The olefin oligomer is useful as raw material for lubricating oil such as car engine oil, aircraft hydraulic oil and electrically insulating oil. In recent years especially, olefin oligomers having comparatively low viscosity are considered to be quite useful as a raw material for car engine oil. More particularly, oligomers of linear α-olefin having 10 carbon atoms, i.e., 1-decene, especially oligomers mainly containing trimer of 1-decene have attracted considerable attention.

As the foregoing method for producing oligomers, cationic polymerization processes using a catalyst of Lewis acid such as boron trifluoride is practiced widely. Meanwhile, several attempts have been done widely in order to develop the methods of controlled polymerization and those which are inexpensive and free from environmental pollution.

For example, in Japanese Laid-Open Patent Publication No. H06-287211, it is disclosed that olefin oligomers of comparatively low viscosity can be produced by a method using boron trifluoride catalyst. In this case, however, there is a problem that the controlling of reaction rate of polymerization is difficult. As the countermeasure to this, polymerization method for obtaining olefin oligomers is disclosed, which method uses as polymerization catalyst a boron trifluoride complex catalyst that has boron trifluoride incorporated in a complex.

In the production of olefin oligomers in recent years, boron trifluoride complex catalysts are usually preferred. For each complex catalyst, as in the case of production of polyisobutene, specific complexing agent is selected, and its molar coordination number is also specified.

After the termination of polymerization reaction for polybutene or olefin oligomer as above, boron trifluoride in complex must be removed from the reaction mixture. For this purpose, the reaction mixture is usually neutralized with an aqueous solution of basic substance such as ammonia, caustic soda and lime, then it is washed with water. However, as mentioned above, an environmental problem and other disadvantages are pointed out.

In the following, prior art on the removing and recovering of boron trifluoride used in various kinds of reactions will be described.

For example, methods for separating boron trifluoride complex catalysts from reaction mixtures by heating are proposed. In U.S. Pat. No. 4,263,467 by A. M. Madgavkar, et al., a method is disclosed wherein boron trifluoride is taken out as gas by causing a reaction mixture to move slowly on a floor made of inert metal or ceramics.

In Japanese Laid-Open Patent Publication No. H06-287211, a system using a boron trifluoride complex catalyst is described. It is disclosed that a reaction mixture is heated so as to generate boron trifluoride gas, excess complexing agent is brought into contact with the generated gas to form a new complex, and the complex is recycled to a reactor for reuse.

Further, in Japanese Laid-Open Patent Publication No. H08-333472, the production of α-olefin oligomer is described, wherein boron trifluoride complex catalyst composed of boron trifluoride and reaction accelerator of $C_1$ to $C_8$ alkanol is used. In this case, the method comprises a process of thermally decomposing the complex in product fluid to obtain boron trifluoride gas and contacting the gas with a low temperature stream of a-olefin oligomer containing an accelerator, for reuse.

However, in these methods, highly reactive boron trifluoride or its complex is heated in the coexistence of reaction mixture, so that the composition of the reaction mixture may be influenced seriously. In the case of the olefin oligomer containing particularly much α-olefin structure as mentioned above, isomerization or thermal deterioration of olefin is caused by heating it in the coexistence of the complex. As a result, the quality of product deteriorates.

As the other device for recovering boron trifluoride complex catalysts described in U.S. Pat. Nos. 4,454,366 and 4,384,162 by R. F. Vogel, et al., it is disclosed that polyvinyl alcohol is used in order to take out boron trifluoride in oligomerization. In U.S. Pat. No. 4,433,197 by R. F. Vogel, et al., the reaction product is brought into contact with silica to remove boron trifluoride. In U.S. Pat. No. 4,429,177 by N. E. Morganson, et al. and U.S. Pat. Nos. 4,213,001 and 4,308,414 by A. M. Madgavkar, et al., silica is also used as absorbent for boron trifluoride in oligomerization. In U.S. Pat. No. 4,394,296 by A. M. Madgavkar, et al., it is disclosed that boron trifluoride and cocatalyst of silica hydrate are used in an oligomerization process, then silica is filtered off for recycling.

As to these prior arts of removing boron trifluoride using polyvinyl alcohol or silica, the present inventors carried out confirmatory test. As a result, the following important information was obtained on the reuse of both the absorbents.

That is, in the former case using polyvinyl alcohol, the alcohol itself is poor in thermal resistance, so that it cannot stand repeated uses as absorbent after desorbing boron trifluoride by heating.

In the latter case using silica, functional groups such as siloxane and silanol group existent in a silica molecule decompose boron trifluoride when boron trifluoride is removed. Therefore, it is difficult to recover boron trifluoride in a reusable state.

As another method for removing boron trifluoride, it is disclosed in U.S. Pat. No. 4,981,578 by L. T. Tycer, et al. that boron trifluoride is removed by bringing a product stream of olefin oligomer into contact with a solid or aqueous solution of KF, NaF or $NH_4F$. In U.S. Pat. No. 4,956,513 by H. W. Walker, et al., it is disclosed that boron trifluoride is removed from a product of oligomerization by extracting with water.

However, it is intended in the above methods only to remove boron trifluoride from a product stream containing boron trifluoride complex catalyst but they do not aim to recover boron trifluoride in reusable state. Furthermore, in the former method, even though boron trifluoride is removed using KF, NaF or $NH_4F$, thermal decomposition temperatures of sodium tetrafluoroborate ($NaBF_4$) and potassium tetrafluoroborate ($KBF_4$) are higher than 650° C. and 750° C., respectively. Considering the energy cost required for thermal decomposition in recovering boron trifluoride, the method is not acceptable in industrial working. Furthermore, $NH_4F$ is very low in thermal resistance in itself and decomposes into $NH_3$ and HF, so that its use is not practical.

Still further, in a method for recovering boron trifluoride described in U.S. Pat. No. 2,997,371, acrylonitrile is polymerized on active carbon and boron trifluoride in gas is removed by polyacrylonitrile supported on the active carbon. However, the capacity of adsorption is not sufficient. Further, the temperature for desorbing boron trifluoride is not lower than the melting point of polyacrylonitrile, so that polyacrylonitrile cannot be used repeatedly after desorption.

From the disclosures of various production processes using boron trifluoride complex catalysts in the above prior art, it is understood that various methods for removing boron trifluoride were proposed and various efforts were made during their developments. However, under the present situations, any economical method for recovering boron trifluoride in reusable form without causing environmental pollution, has not been proposed.

An object of the present invention is, therefore, to provide a method to remove at high efficiency the expensive and detrimental boron trifluoride from a fluid containing boron trifluoride or its complex by economical means without causing environmental pollution. Another object of the invention is to provide a method to recover boron trifluoride in a reusable form.

A further other object of the invention is to apply the forgoing recovery method to the production of polyolefin such as polybutene and olefin oligomer, and to provide a method for producing polyolefin, which method comprises recovering boron trifluoride and a complexing agent separately, preparing the complex again and reusing it as catalyst.

DISCLOSURE OF INVENTION

The present inventors investigated according to the foregoing objects, they have found out an epoch-making method, wherein boron trifluoride is removed from a fluid containing boron trifluoride or its complex and boron trifluoride is recovered in a reusable form. Furthermore, as application of the above method to the production of polyolefin, they have found out a method for producing polyolefin to accomplish the present invention, which method comprises removing and recovering boron trifluoride from a reaction mixture, preparing a complex and reusing it.

Thus, a first aspect of the present invention relates to a method for removing boron trifluoride, which method comprises the step of bringing a fluid containing boron trifluoride or boron trifluoride complex into contact with a metal fluoride shown in the following formula [1], thereby causing the metal fluoride to adsorb selectively boron trifluoride in the complex.

$$MF_n \qquad [1]$$

wherein M is a metal atom such as lithium, calcium, strontium or barium and n is 1 or 2.

A second aspect of the present invention relates to a method for removing boron trifluoride as described in the first aspect, wherein the contact temperature is 100° C. or below.

A third aspect of the present invention relates to a method for removing boron trifluoride as described in the first aspect, wherein the boron trifluoride complex is the one that is formed of boron trifluoride and an organic or inorganic polar compound.

A fourth aspect of the present invention relates to a method for removing boron trifluoride as described in the third aspect, wherein the organic or inorganic polar compound is the one selected from the group consisting of oxygen-containing compound, nitrogen-containing compound, sulfur-containing compound, phosphorus-containing compound and inorganic acid.

A fifth aspect of the present invention relates to a method for removing boron trifluoride as described in the fourth aspect, wherein the oxygen-containing compound is the one selected from the group consisting of water, alcohols, ethers, phenols, ketones, aldehydes, esters, organic acids and acid anhydrides.

A sixth aspect of the present invention relates to a method for recovering boron trifluoride comprising the following Steps:

(Step 1): to bring a fluid containing boron trifluoride or a boron trifluoride complex into contact with metal fluoride shown in the following formula [1], thereby causing the metal fluoride to adsorb selectively the boron trifluoride ($BF_3$) in the complex to form a metal tetrafluoroborate shown in the following formula [2], $$MF_n \qquad [1]$$

$$M(BF_4)_n \qquad [2]$$

wherein M is a metal atom such as lithium, calcium, strontium or barium and n is 1 or 2.

(Step 2): to heat the metal tetrafluoroborate obtained in the Step 1 in the temperature range of 100 to 600° C. to obtain boron trifluoride and the metal fluoride.

A seventh aspect of the present invention relates to a method for recovering boron trifluoride as described in the sixth aspect, wherein the temperature for heating the metal tetrafluoroborate in the Step 2 is 500° C. or below.

An eighth aspect of the present invention relates to a method for producing polyolefin using olefin having 4 or more carbon atoms as a feed material, which method comprises the following steps (I) to (III):

Step (I): to polymerize olefin in a liquid phase in the presence of a boron trifluoride complex catalyst comprising boron trifluoride and complexing agent, Step (II): to bring the reaction mixture having at least a part of dispersed and/or dissolved boron trifluoride complex into contact with metal fluoride shown in the following formula [1], thereby causing the metal fluoride to adsorb selectively boron trifluoride ($BF_3$) in the complex catalyst to form metal tetra-fluoroborate shown in the following formula [2], $$MF_n \qquad [1]$$

$$M(BF_4)_n \qquad [2]$$

wherein M is a metal atom such as lithium, calcium, strontium or barium and n is 1 or 2.

Step (III): to recover the reaction mixture containing the complexing agent from which boron trifluoride was separated by adsorption.

A ninth aspect of the present invention relates to a method for producing polyolefin using olefin having 4 or more carbon atoms as a feed material, which method comprises the following Steps (I) to (V):

Step (I): to polymerize olefin in a liquid phase in the presence of boron trifluoride complex catalyst comprising boron trifluoride and a complexing agent, Step (II): to bring the reaction mixture having at least a part of dispersed and/or dissolved boron trifluoride complex into contact with metal fluoride shown in the following formula [1], thereby causing the metal fluoride to adsorb selectively boron trifluoride ($BF_3$) in the complex catalyst to form metal tetrafluoroborate shown in the following formula [2], $$MF_n \qquad [1]$$

$$M(BF_4)_n \qquad [2]$$

wherein M is a metal atom such as lithium, calcium, strontium or barium and n is 1 or 2.

Step (III): to recover the reaction mixture containing the complexing agent from which boron trifluoride was separated by adsorption, Step (IV): to heat the metal tetrafluoroborate obtained in the Step (II) in the temperature range of 160 to 600° C. to obtain boron trifluoride and the metal fluoride Step (V): to polymerize olefins in a liquid phase using at least a part of the recovered boron trifluoride as catalyst.

A tenth aspect of the present invention relates to a method for producing polyolefin using olefin having 4 or more carbon atoms as a feed material, which method comprises the following Steps (I) to (VI):

Step (I): to polymerize olefin in a liquid phase in the presence of boron trifluoride complex catalyst comprising boron trifluoride and a complexing agent, Step (II): to bring the reaction mixture having at least a part of dispersed and/or dissolved boron trifluoride complex into contact with metal fluoride shown in the following formula [1], thereby causing the metal fluoride to adsorb selectively boron trifluoride ($BF_3$) in the complex catalyst to form metal tetrafluoroborate shown in the following formula [2], $$MF_n \qquad [1]$$

$$M(BF_4)_n \qquad [2]$$

wherein M is a metal atom such as lithium, calcium, strontium or barium and n is 1 or 2.

Step (III): to recover the reaction mixture containing the complexing agent from which boron trifluoride was separated by adsorption, Step (IV): to heat the metal tetrafluoroborate obtained in the Step (II) in the temperature range of 160 to 600° C. to obtain boron trifluoride and the metal fluoride, Step (V): to recover the complexing agent which is liberated into the reaction mixture when boron trifluoride in the complex catalyst is adsorbed in the Step (II), Step (VI): to prepare new boron trifluoride complex catalyst using at least a part of the boron trifluoride recovered from the Step (IV) and the complexing agent recovered from the Step (V) respectively, and to polymerize olefin in a liquid phase using the new catalyst.

An eleventh aspect of the present invention relates to a method for producing polyolefin as described in any of eighth to tenth aspects, wherein the feed material for polymerization is $C_4$ olefin and the polyolefin is polybutene.

A twelfth aspect of the present invention relates to a method for producing polyolefin as describe in any of eighth to tenth aspects, wherein the feed material for polymerization is olefin having 5 or more carbon atoms (hereinafter referred to as "olefins of $C_5$ or higher") and the polyolefin is olefin oligomer.

A thirteenth aspect of the present invention relates to a method for producing polyolefin as described in any of eighth to twelfth aspects, wherein the concentration of olefin in the feed material in the liquid phase polymerization is at least 5% by weight.

A fourteenth aspect of the present invention relates to a method for producing polyolefin as described in any of eighth to twelfth aspects, characterized in that the temperature of the reaction mixture in contact with the metal fluoride is in the range of −100 to +160° C., preferably −30 to +50° C.

A fifteenth aspect of the present invention relates to a method for producing polyolefin as described in any of eighth to twelfth aspects, characterized in that the molar ratio of boron trifluoride relative to the complexing agent in the boron trifluoride complex catalyst is in the range of 0.01:1 to 2:1.

A sixteenth aspect of the present invention relates to a method for producing polyolefin as described in any of eighth to twelfth aspects, characterized in that the molecular weight of the polyolefin is in the range of 100 to 100,000.

In the following, the present invention will be described in more detail.

Boron trifluoride and boron trifluoride complex comprising boron trifluoride and complexing agent are classified in Friedel-Crafts type catalyst such as $AlCl_3$, $FeCl_3$, and sulfuric acid in view of catalytic effect. Furthermore, it is known that the catalytic performance is superior to $AlCl_3$, $FeCl_3$, sulfuric acid and so forth in that it has the effect to suppress side reaction other than main reaction. Therefore, boron trifluoride and its various complexes are widely used in industrial fields as catalysts for various chemical reactions such as alkylation, isomerization, polymerization, decomposition and dehydration.

For example, when ethylbenzene is produced by gas phase alkylation using ethylene obtained by naphtha cracking and benzene, boron trifluoride is utilized.

For producing alkylbenzene that has a large market in use for synthetic detergent, antioxidant and so forth, liquid phase alkylation is carried out using lower olefin and aromatic compounds. In this production, boron trifluoride or its complex is similarly used.

$C_9$ aromatic olefin fraction and $C_5$ diolefin fraction obtained by naphtha cracking can be polymerized separately or in a mixture with acid catalyst to obtain hydrocarbon resin having low molecular weight. The obtained resin is usually called as petroleum resin and it is used widely in the fields of adhesives, printing inks and so forth. As a polymerization catalyst for producing this resin, boron trifluoride or its complex is also used widely in industrial field.

As described above, boron trifluoride or its complex are used for various purposes as catalysts in the field of chemical industry. In addition, they are also used widely in other fields such as medicines and semiconductors.

In the above reactions such as alkylation, the fluid of reaction mixture containing boron trifluoride or its complex flows out from a reaction system after the reaction. A typical example of the fluid containing boron trifluoride or its complex used in the present invention is, as described above, the fluid from a producing process using boron trifluoride or its complex as catalyst. Generally, the fluid is a liquid or gas that does not form any complex with boron trifluoride. It can be a gas such as air and nitrogen gas, or a liquid of organic compound such as hydrocarbon, alcohol, ether, ketone and ester, or their vapors, as long as they do not form any complex. In such a fluid, boron trifluoride, its complex, or both of them in certain cases exist in the state of solution or dispersion.

However, when a fluid that dissolves metal fluorides or metal tetra-fluoroborate (reaction products of metal fluoride and boron trifluoride) is used in the step for adsorbing and removing boron trifluoride, it is not preferable that the above adsorption step is hardly accomplished. Exemplified as the unsuitable fluids in the present invention are fluid of ammonium salt, hydrofluoric acid or hydrochloric acid, and fluid containing any of these compounds.

As the subject matter to be treated according to the present invention, a fluid containing boron trifluoride complexes as well as a fluid containing boron trifluoride itself can be used. Even when the fluid contains the complex, it is possible to adsorb only boron trifluoride by treating it with the method of the present invention.

Therefore, as the modes of fluid that can be used in the present invention, there are exemplified by organic liquid mixtures containing boron trifluoride or its complex in dispersed or dissolved state in an organic liquid; organic liquid mixtures containing the vapor of boron trifluoride or its complex in dissolved or dispersed state in an organic liquid; and gaseous mixtures containing the vapor of boron trifluoride or its complex in a certain gas such as waste gas.

Furthermore, only in the case of using barium fluoride as the above metal fluoride, boron trifluoride forms complexes, by coordinate bond, with oxygen-containing compounds such as alcohol, ether, ketone and ester. Therefore, when these oxygen-containing compounds are contained in a fluid, the amount of barium fluoride used for adsorbing and removing boron trifluoride according to the present invention increases. Accordingly, it is preferable that the fluid containing boron trifluoride or its complex does not contain oxygen-containing compounds, because the amount of barium fluoride to be used can be decreased. In the case of metal fluorides other than barium fluoride, the above problem need not be considered in particular.

Exemplified as complexing agents for forming boron trifluoride complex catalysts suitable for the present invention are specific polar compounds. They are, for example, organic or inorganic polar compounds such as oxygen-containing compounds like alcohols, ethers, phenols, ketones, aldehydes, esters, organic acids and acid anhydrides, nitrogen-containing compounds, sulfur-containing compounds, phosphorus-containing compounds and inorganic acids.

As alcohols specifically, aromatic or $C_1$ to $C_{20}$ aliphatic alcohols can be used, wherein the $C_1$ to $C_{20}$ carbon structure can be either linear alkyl group or branched alkyl group, that is, the alkyl group may be n-, sec- or tert-alkyl group, alicyclic group, or alkyl group containing alicyclic ring. More specifically, methanol, ethanol, propanol, butanol, pentanol, hexanol, heptanol, octanol, nonanol, decanol, benzyl alcohol, cyclohexanol and the like can be used, though the alcohols are not limited to these compounds. Further, polyhydric alcohols such as diols and triols can be used.

As for ethers, those containing aromatic or $C_1$ to $C_{20}$ aliphatic hydrocarbon group can be used. The $C_1$ to $C_{20}$ carbon structure can be either a linear alkyl group or a branched alkyl group, that is, the alkyl group can be n-, sec- or tert-alkyl group, alicyclic group, or alkyl group containing alicyclic ring. Specifically, dimethyl ether, diethyl ether, methyl ethyl ether, dipropyl ether, methyl propyl ether, ethyl propyl ether, dibutyl ether, methyl butyl ether, ethyl butyl ether, propyl butyl ether, dipentyl ether, or phenyl methyl ether, phenyl ethyl ether, diphenyl ether, cyclohexyl methyl ether, cyclohexyl ethyl ether and the like can be used.

As for phenols, monohydric to trihydric phenols are suitable, and specifically, phenol, cresol and the like are preferable.

As for ketones, those containing aromatic or $C_1$ to $C_6$ hydrocarbon groups can be used. The $C_1$ to $C_6$ carbon structure can be either a linear alkyl group or a branched alkyl group, that is, the alkyl group can be n-, sec- or tert-alkyl group, alicyclic group, or alkyl group containing alicyclic ring. Specifically, methyl ethyl ketone, diethyl ketone, methyl butyl ketone, cyclohexanone and the like can be used.

As for esters, those containing ester combinations formed with a component of aromatic or $C_1$ to $C_6$ aliphatic alcohol and a component of aromatic or $C_1$ to $C_6$ aliphatic carboxylic acid or phosphoric acid can be used. The $C_1$ to $C_6$ carbon structure can be either a linear alkyl group or a branched alkyl group, that is, the alkyl group can be n-, sec- or tert-alkyl group, alicyclic group, or alkyl group containing alicyclic ring. Specifically, methyl formate, ethyl formate, methyl acetate, ethyl acetate, propyl acetate, butyl acetate, pentyl acetate, hexyl acetate, ethyl hexanoate, ethyl benzoate, and complete esters of phosphoric acid such as tributyl phosphate can be used.

As for organic acids, aromatic or $C_1$ to $C_6$ aliphatic carboxylic acids, halogen-substituted products of these acids, phosphoric acid and partial esters comprising phosphoric acid and aromatic or $C_1$ to $C_6$ aliphatic alcohols can be used. The $C_1$ to $C_6$ carbon structure can be either a linear alkyl group or a branched alkyl group, that is, the alkyl group can be n-, sec- or tert-alkyl group, alicyclic group, or alkyl group containing alicyclic ring. Specifically, formic acid, acetic acid, propionic acid, oxalic acid, malonic acid, benzoic acid, diethyl phosphate and so forth can be used.

These complexing agents can be used singly in each complex system, and can be also used in a mixture containing two or more kinds in an appropriate ratio. These complexes can be prepared according to the well-known methods. For example, the complex can be prepared previously. Besides, after putting boron trifluoride and one or more complexing agents into a reaction system in a certain ratio separately or simultaneously, they can be formed into boron trifluoride complex in a reaction liquid.

In a complex used in the present invention, the molar ratio of boron trifluoride to a complexing agent is not particularly limited. Any complex can be used regardless of the molar ratio. However, it is usually in the range of 0.01 to 100, inclusive.

When the boron trifluoride contained in a fluid is a complex as mentioned above, the concentration of boron trifluoride may be sometimes rather high. However, it is usually preferable to use a dilute solution of boron trifluoride in order to increase the efficiency of removing. Specifically, the concentration of boron trifluoride is 10% by weight or less, and preferably less than 5% by weight. The lower the concentration is, the higher the efficiency of removing is. Therefore, the lower limit of the concentration is not determined particularly. The dilution can be done appropriately so that the concentration may be in the above range. As fluids for dilution, any kind of diluent can be used as long as it does not form a complex with boron trifluoride. For example, it can be selected from the liquids exemplified above.

In the following, the metal fluorides used for adsorbing boron trifluoride in the present invention will be explained one after another, namely, lithium fluoride, calcium fluoride, strontium fluoride and barium fluoride.

In the first place, lithium fluoride is used largely in various industries including fluorescent substance, optical glass, ceramic filter, flux for welding, glaze and so forth. In the present invention, any kind of substance may be used such as natural substances, synthetic substances, and those obtained from industrial wastes. As a natural substance, it is preferable to select the material that is refined up to 98% or more in lithium fluoride content.

Furthermore, it is known that lithium fluoride can be synthesized from lithium hydroxide or lithium carbonate and hydrofluoric acid according to the reaction shown in the following formula [3] or [4]. The synthetic substance produced by this method can also be used. The lithium fluoride synthesized by these reactions is separated by operations such as gravity settling or filtration. Then, it can be used intact, however, it is more favorable that the lithium fluoride is washed with water or alkali, taking the advantage of small solubility of lithium fluoride in water, then heated and dried for use in the method of the present invention.

$$HF + LiOH \rightarrow LiF + H_2O \quad [3]$$

$$2HF + Li_2CO_3 \rightarrow 2LiF + H_2O + CO_2 \quad [4]$$

Furthermore, in the production process using hydrogen fluoride or else, hydrogen fluoride is sometimes neutralized according to the above formula [3] or [4] to deactivate catalyst. In this case, the by-product of lithium fluoride is formed as an industrial waste. This lithium fluoride as the by-product can also be used.

Next, calcium fluoride is used largely in various industries including iron and steel works, nickel refinery, and other industries such as glass, enamel and cement. In the present invention, any kind of materials obtained from natural substances, synthetic substances and industrial wastes can be used.

As for the natural substance, the well known "fluorite" can be used. It is an ordinary natural ore produced largely in many countries in the world including Mexico, Russia, France, Spain, China, Thailand, United States of America, Italy, South Africa and so forth. It is desirable to select the colorless, highly pure ore containing calcium fluoride of 98% or more.

Furthermore, it is known that calcium fluoride can be synthesized from hydrofluoric acid (HF) and slaked lime ($Ca(OH)_2$) or calcium chloride ($CaCl_2$) according to the reaction shown in the following formula [5] or [6], and the synthetic substance produced by this method can be also used. The calcium fluoride synthesized by these reactions is separated by operations such as gravity settling or filtration. Then, it can be used intact, however, it is more preferable that the calcium fluoride is washed with water or alkali, taking advantage of small solubility of calcium fluoride in water, then it is heated, dried and used in the present invention.

$$2HF + Ca(OH)_2 \rightarrow CaF_2 + 2H_2O \quad [5]$$

$$2HF + CaCl_2 \rightarrow CaF_2 + 2HCl \quad [6]$$

Furthermore, in producing alkylbenzene or the like, hydrogen fluoride or else is sometimes used. After the end of reaction, hydrogen fluoride is usually neutralized according to the reaction shown in the above formula [5] or [6] to deactivate catalysts. In this case, the by-product of calcium fluoride is produced as industrial waste. This calcium fluoride as by-product can also be used.

Next, strontium fluoride is used largely in various industries including fluorescent substance, optical glass, ceramics filter and so forth. In the present invention, any kind of materials may be used among natural substance, synthetic substance, substance made from industrial wastes and so forth.

As a natural substance, it is preferable to select the one that is refined so highly that strontium fluoride is contained in 98% or more.

Further, it is known that strontium fluoride can be synthesized from strontium carbonate and hydrofluoric acid according to the reaction shown in the following formula [7], and the synthetic substance obtained by this method can be also used. The strontium fluoride synthesized by these reactions is separated by operations such as gravity settling or filtration. Then, it can be used intact, however, it is more favorable that the strontium fluoride is washed with water or alkali, taking the advantage of little solubility of strontium fluoride in water, then it is heated, dried and used in the present invention.

$$2HF + SrCO_3 \rightarrow SrF_2 + H_2O + CO_2 \quad [7]$$

Furthermore, in production processes using a catalyst of hydrogen fluoride, hydrogen fluoride is neutralized in certain cases according to the above formula [7] to deactivate the catalyst. In this case, a by-product of strontium fluoride is produced as industrial waste. This strontium fluoride as by-product can be also used.

Next, barium fluoride is used largely in various industries including flux for enamel wares, matting agent, carbon brush for electric motor, thermal treatment of metal, preservative treatment, refining of highly pure aluminum, luminescent carbon for projection, flux for welding, glaze and so forth. In the present invention, any kind may be used among natural substance, synthetic substance, substance made from industrial wastes and so forth.

As a natural substance, it is preferable to select the one that is refined so highly that barium fluoride is contained in 98% or more.

Furthermore, it is known that barium fluoride can be synthesized from barium carbonate and hydrofluoric acid according to the reaction shown in the following formula [8], and the synthetic substance by this method can be also used. The barium fluoride synthesized by these reactions is separated by operations such as gravity settling or filtration. Then, it can be used intact, however, it is more preferable that the barium fluoride is washed with water or alkali, taking advantage of little solubility of barium fluoride in water, then heated, dried and used in the present invention.

$$2HF + BaCO_3 \rightarrow BaF_2 + H_2O + CO_2 \quad [8]$$

Furthermore, in production processes using hydrogen fluoride, it is neutralized in certain cases according to the above formula [8] to deactivate catalysts. In this case, a by-product of barium fluoride is produced as industrial waste. This barium fluoride as by-product can be also used.

When a fluid containing boron trifluoride or its complex is brought into contact with the above metal fluoride ($MF_n$), the reaction shown in the following formula [9] or [10] progresses easily, so that the metal fluoride is transformed into a metal tetrafluoroborate ($M(BF_4)_n$). Still further, at that time, the complexing agent in catalyst is released into the reaction mixture in liberated form. As a result, only the intended boron trifluoride can be caught and removed from the reaction mixture.

$$nBF_3 + MF_n \rightarrow M(BF_4)_n \quad [9]$$

$$n[BF_3\text{-(complexing agent)}] + MF_n \rightarrow M(BF_4)_n + n(\text{complexing agent}) \quad [10]$$

wherein M is a metal atom such as lithium, calcium, strontium or barium and n is 1 or 2.

As to the temperature at which boron trifluoride is adsorbed and removed, each metal fluoride has its own acceptable maximum temperature because the efficiency of chemical adsorption varies depending on the kind of metal fluoride. That is, the following temperatures can be adopted: 160° C. or below for lithium fluoride, 200° C. or below for calcium fluoride and 250° C. or below for strontium fluoride and barium fluoride. However, considering the changes of composition and chemical structure of the product, the desirable range of adsorption temperature is 100° C. or below. The phase of fluid for contacting operation can be any of gas, liquid and mixed phase containing both of them.

All the above metal fluorides ($MF_n$) have colorless crystal structures of cubic system. Among them, calcium fluoride, strontium fluoride and barium fluoride have "fluorite structure". The metal tetrafluoroborate ($M(BF_4)_n$) which is formed after adsorbing boron trifluoride is known to have a colorless crystal structure of rhombic system, according to the report, for example, by T. H. Jordan, et al. (Acta Crystallogr., Sect. B, B31 [3] (1975), p. 669–672). Accordingly, both metal fluoride and metal tetrafluoroborate are very stable inorganic crystalline substances. Changes of the crystal structure before and after adsorption can be observed easily by X-ray diffraction analysis.

The method for bringing a fluid into contact with a metal fluoride is not limited in particular. For example, a fixed bed packed with metal fluoride alone or with an inert inorganic filler containing metal fluoride or the like can allow the passage of the fluid containing boron trifluoride or its complex. As inert inorganic fillers, active carbon, packing made of stainless steel and so forth are used, but the materials are not limited to the above, and the shape of them is not limited either.

It is not necessary to calcine the metal fluoride completely. However, when the recovered boron trifluoride is reused with avoiding moisture, it is preferable to use the metal fluorides after calcining until the moisture is released.

The particle diameter of metal fluoride to be used is not limited in particular. For example, the commercially available metal fluoride is in the form of fine particles in the range of 1 to 10 $\mu$m in particle size distribution. These powder particles can be used after forming it into uniform particles having suitable size distribution. In order to increase the efficiency for adsorbing boron trifluoride, it is preferable to increase the surface area of metal fluoride as adsorbent. From this point of view, it is preferable that the particle size is as small as possible. However, in order to facilitate the adsorbing operation, the particle diameter may be selected appropriately.

Furthermore, the shape of metal fluoride is not especially limited either. For example, the cross section of each particle can be ordinarily circular, or particles may be hollow or a special form such as porous. It is preferable to select the particle shape appropriately in view of the purpose.

The contacting operation for adsorption can be carried out in any of flow type using an adsorption pipe or column packed with particles of metal fluoride and so forth as mentioned above, or in batch type. The contact time is not limited particularly and can be determined appropriately. In flow type operation, space velocity can be usually selected in the range of 0.01 to 10 $hr^{-1}$.

When a metal fluoride is lithium fluoride, the molar amount of metal fluoride required for removing boron trifluoride completely in a batch type must be the same as or more than the molar amount of boron trifluoride contained in a fluid treated. When a metal fluoride is calcium fluoride, strontium fluoride or barium fluoride, the molar amount of metal fluoride must be not less than 0.5 times as large as the molar amount of boron trifluoride. In order to increase the efficiency of removing, it is preferable to increase further the amount of metal fluoride, which amount can be selected appropriately.

By the above-mentioned method of contacting a fluid containing boron trifluoride or its complex with metal fluoride, the boron trifluoride in the above fluid is adsorbed chemically by metal fluoride, and then separated and removed from the fluid.

After adsorption, metal fluoride with adsorbed boron trifluoride can be separated from the system by an appropriate method.

The operation of desorption described in the following can be carried out in the adsorption tube or column. Otherwise, it can also be carried out after the metal fluoride is transferred into another apparatus.

In order to desorb the boron trifluoride from metal fluoride and recover boron trifluoride in a reusable state, metal tetrafluoroborate ($M(BF_4)_n$) formed by adsorption is heated. It is possible to convert the metal tetrafluoroborate into pure boron trifluoride gas and the original adsorbent of metal fluoride according to the reaction shown in the following formula [11].

$$M(BF_4)_n \rightarrow nBF_3 + MF_n \quad [11]$$

wherein M is a metal atom such as lithium, calcium, strontium or barium and n is 1 or 2.

The heating can be carried out under the existence of suitable inert gas such as nitrogen. Heating can also be carried out in a suitable organic solvent, as long as the solvent is inert. The temperature for desorption of boron trifluoride gas is 100° C. or above. In order to increase the rate of desorption sufficiently, it is desirable to carry out at temperatures of 160° C. or above. However, as shown in the following, the temperature required for the sufficient desorption of boron trifluoride varies depending on the kind of metal fluoride selected. Therefore, it is desirable to select the temperature for desorption appropriately.

| Desorption Temperature for each metal | |
|---|---|
| Lithium: | 160° C. or above |
| Calcium: | 210° C. or above |
| Strontium: | 260° C. or above |
| Barium: | 240° C. or above |

The upper limit of the temperature required for desorption is not limited in particular, because all of metal fluorides used in the present invention are stable crystals, which do not melt up to about 1,000° C. That is, each of lithium fluoride up to about 850° C., calcium fluoride and strontium fluoride up to 1,400° C., and barium fluoride up to about 1,350° C. is a stable crystal that does not melt in inert gases.

However, an extremely high temperature of above 600° C. is unnecessary essentially, that is, high temperature causes unfavorably increase of energy cost, decomposition of organic solvent, and corrosion of apparatus by boron trifluoride gas. Furthermore, it is known that an oxide is formed when strontium fluoride is heated at a temperature above 1,000° C. in the air.

The time required for desorption of boron trifluoride is not especially limited if the temperature is in the above described ranges. The longer the time of heating is, the higher the rate of desorption of boron trifluoride is. However, the longer time is not economical, so that the time is usually set to 100 hours or less.

When a metal fluoride as adsorbent is used repeatedly, it is preferable economically to keep the rate of desorption on an appropriate level.

By the above operation of heating, boron trifluoride is recovered in the form of highly pure boron trifluoride without suffering decomposition. The adsorbent is restored to the original metal fluoride of high purity. Therefore, the metal fluoride used for adsorption and desorption in the present invention can be used repeatedly as occasion demands.

Because the desorbed boron trifluoride is highly pure, it is recovered by suitable means and used for appropriate process. For example, it can be reused for the process, from which the treated fluid was obtained. Furthermore, the desorbed boron trifluoride can be absorbed or adsorbed by solid alkali or the like to be discarded.

In the following, a method for recovering complex catalyst and reusing it for reaction will be explained, wherein the above process for removing and recovering boron trifluoride is applied to the production of polyolefin using boron trifluoride complex catalyst.

Both production processes of polybutene and olefin oligomer are carried out by cationic polymerization of olefin, and boron trifluoride complex catalyst is used preferably as polymerization catalyst. After these reactions, at least a part of boron trifluoride complex catalyst exists stably in dissolved and/or dispersed state in reaction mixture. It is difficult to separate the complex catalyst from the reaction mixture as it stands and to reuse them. Accordingly, by adopting the above method for recovering in the present invention, the production method can be improved markedly.

In the production of polybutene, $C_4$ olefins such as butadiene, isobutene, butene-1 and cis- or trans-butene-2 are mainly polymerized using boron trifluoride complex catalyst. $C_4$ olefins can also be used for polymerization as a mixture together with $C_2$ to $C_{20}$ aliphatic olefins such as ethylene, propylene, isoprene, pentene and hexene-1; $C_8$ to $C_{10}$ aromatic olefins such as styrene and vinyl toluene; and alicyclic olefins such as DCPD.

As industrial feed materials, it is possible to use $C_5$ fraction containing aliphatic olefins such as piperylene, or $C_4$ fraction containing olefins such as 1-butene and trans- or cis-2-butene as well as isobutene, further, isobutane and n-butane.

Next, in the production of olefin oligomer, the $C_5$ or higher olefins used as feed materials for polymerization are not limited particularly. Any olefin can be used as long as cationic polymerization can be carried out using boron trifluoride complex catalyst. Among olefins of $C_5$ or higher, those having 6 to 18 carbon atoms are desirable, and those having 8 to 14 carbon atoms are more desirable. Specifically, octene, nonene, decene, undecene, dodecene, tridecene, tetradecene and so forth are used. These olefins can be used for polymerization singly or in a mixture.

As olefins of $C_5$ or higher, any olefin can be used among the olefin having double bonds in the terminal position of carbon chain and the inner olefin having double bonds inside carbon chain. However, it is preferable to use α-olefin, especially 1-decene having 10 carbon atoms.

In polymerization, the concentration of olefin present in a feed material is preferably in the range of 5 to 100% by weight. The concentration of olefin of lower than 5% by weight is unfavorable practically because its economical disadvantage is large.

Solvent for dilution is not needed particularly. However, solvents inert to the reaction can be used appropriately in addition to the olefins if desired. Exemplified as solvents are saturated chain hydrocarbons including n-paraffins such as n-butane and n-hexane, and isoparaffins such as isobutane and isooctane; alicyclic hydrocarbons such as cyclohexane, methylcyclohexane and decalin; and halogenated hydrocarbons such as carbon tetrachloride, chloroform and methylene chloride.

The kinds of complexing agents forming complexes with boron trifluoride and the method for forming complexes are the same as mentioned above. The molar ratio of boron trifluoride and complexing agent is preferably in the range of 0.01:1 to 2:1. If the molar ratio of boron trifluoride to complexing agent is lower than 0.01, the activity of catalyst is too low for proceeding the intended polymerization. On the other hand, if the molar ratio of boron trifluoride against complexing agent is higher than 2, the amount of boron trifluoride is too much as compared with complexing agent so as to keep a stable coordination. As a result, the molar ratio of boron trifluoride against complexing agent cannot be maintained in catalyst recovery. When the recovered boron trifluoride complex catalyst is reused as described later, the above operation such as adjustment of molar ratio is necessary. Therefore, it is important to control so that the molar coordination ratio would not change.

In cationic polymerization of olefins, the use amount of boron trifluoride is usually 0.0001 to 0.5 mole to 1 mole of polymerizable olefin components. The use amount of boron trifluoride changes depending on the kind of olefin, the temperature in polymerization system and so forth. For example, when olefin is 1-decene and the temperature of polymerization is 25° C. in the production of an olefin oligomer, the amount of boron trifluoride is about 0.20 g/100 g-olefin.

In the following, the conditions of liquid phase polymerization in the Step (I) will be explained.

In the first place, in the polymerization of $C_4$ olefin, the temperature of polymerization is set in the range of $-100°$ C. to $+50°$ C., preferably $-40°$ C. to $+10°$ C. If the temperature is lower than this range, the conversion rate of $C_4$ olefin is suppressed. On the other hand, if the temperature is higher than that range, the conversion rate is also suppressed, moreover, undesired side reactions such as isomerization and rearrangement are caused to occur.

As the type of reaction, any of continuous type and batch-wise type can be adopted. In view of industrial production, the continuous type is more economical and efficient. In the case of continuous type, the contact time of feed material with catalyst is important, and it is preferably in the range of 5 minutes to 4 hours. If the contact time is less than 5 minutes, sufficient conversion rate of $C_4$ olefin cannot be attained. On the other hand, if it is more than 4 hours, economical loss is large. Furthermore, by contacting the olefin with catalysts for a long period of time, side reactions such as isomerization and rearrangement of the produced butylene polymer are accelerated. Therefore, both cases are not preferable.

In order to improve the commercial profit in the production of butylene polymer, it is desirable that the conversion rate of $C_4$ fraction, for example, $C_4$ olefins in $C_4$ raffinate is higher. By adopting the conditions for polymerization in the present invention, it is possible to attain the conversion rate of isobutene of 80 to 100%.

On the other hand, in the production of olefin oligomer, the temperature of polymerization is usually $-20°$ C. to $+90°$ C., preferably 0 to 50° C. The pressure of polymerization is in the range of 0 to 3.5 MPa·G, preferably 0.001 to 0.5 MPa·G. The resident time of polymerization is 10 minutes to 24 hours, preferably 1 to 16 hours. As to the type of polymerization, any of batch-wise type and continuous type can be adopted.

After the polymerization, a reaction liquid flows out, which contains unreacted components, produced butylene polymer or olefin oligomer and catalyst. In this reaction mixture, boron trifluoride complex catalyst is dissolved or dispersed.

Next, in the Step (II), boron trifluoride is adsorbed and removed from the reaction mixture containing at least a part of the above boron trifluoride complex catalyst that is dissolved and/or dispersed. The reaction mixture and metal fluorides are brought into contact together in the temperature range of $-100°$ C. to $+160°$ C., inclusive, to form metal tetrafluoroborate sown in the above formula [9] or [10]. In this temperature range, the efficiency of chemisorption by boron trifluoride is high. As long as the above mixture is brought into contact in gas phase and/or liquid phase, any temperature of 160° C. or below can be adopted.

However, when boron trifluoride complex catalyst having high activity is heated in the existence of a reaction mixture, in the case of the production of polybutene, vinylidene structures in molecules are isomerized to cause the deterioration of product quality. In the case of producing olefin oligomer, product quality might be also deteriorated owing to the change of compositions and chemical structures. Accordingly, the temperature of adsorption is preferably in the range of $+50°$ C. or below, further preferably $-30°$ C. to $+50°$ C. in each case.

The preferable number average molecular weight of polybutene or olefin oligomer obtained in the present invention is in the range of 100 to 100,000. The effect of removing boron trifluoride in boron trifluoride complex catalyst depends largely on the viscosity of reaction liquid. When polybutene of a small degree of polymerization is produced, the viscosity of reaction liquid is smaller than that obtained when the product of a large degree of polymerization is obtained. Therefore, the efficiency of dispersion in the former case is higher. However, polybutene having a molecular weight less than 100 is not useful, because the molecular weight is too small as the product of polybutene. When the viscosity of a reaction liquid is extremely high, dispersion of metal fluoride and removing by adsorption of boron trifluoride are insufficient. From the viewpoint as above, it is preferable that the viscosity of the present reaction mixture is 10,000 cP (10 Pa·s) or less at the temperature of contacting with metal fluoride.

Furthermore, by adding an inert solvent to the reaction mixture in order to adjust the viscosity of reaction system within the above-mentioned limit, the reaction mixture can be used for removing boron trifluoride of complex catalyst. However, if the molecular weight exceeds 100,000, the amount of solvent for dilution required for separating reaction liquid and adsorbent increases to excess beyond the economical limit.

Using the above method, boron trifluoride in boron trifluoride complex catalysts is subjected to chemisorption by contact with metal fluorides and it is separated from reaction mixture.

Boron trifluoride is removed by the above adsorption, then in the Step (III), the intended products of polyolefins such as polybutene and olefin oligomer can be obtained from the reaction mixture, for example, by a suitable separation method such as distillation. Furthermore, if necessary, complex catalyst contained in the produced polyolefins can be removed by a well-known method such as neutralization. The removal of complex catalyst in polyolefins can be carried out easily, because most of complex catalyst is already removed.

Further, in the Step (IV), the metal tetrafluoroborate obtained in the Step (II) is heated to temperatures in the range of 160 to 600° C., and restored to the pure boron trifluoride and the original metal fluoride as adsorbent according to the reaction shown in the above formula [11].

Moreover, while boron trifluoride is separated and recovered by desorption, complexing agent in boron trifluoride complex catalyst can also be recovered completely from the reaction mixture. More precisely, when boron trifluoride is adsorbed and removed from boron trifluoride complex catalyst, the complex is decomposed and metal fluoride captures boron trifluoride, while the complexing agent is released into the reaction mixture.

The liberated complexing agent can be recovered by distillation or the like method in the Step (V). Therefore, for the purpose of further reducing the cost, it is possible to recover the liberated complexing agent from the reaction mixture and prepare a boron trifluoride complex catalyst again using the recovered complexing agent and the boron trifluoride recovered from the other step. Incidentally, the complexing agent need not be always completely recovered, and the required amount of fresh complexing agent may be supplemented appropriately.

Furthermore, when complex catalyst is recovered and reused as catalyst for producing polybutene or olefin oligomer, attention must be paid so that the coordination number of the complexing agent in a complex catalyst would not be changed. The complexing agent coordinated in a complex show the required catalytic function only after the coordination number is also specified. However, coordination number is liable to change depending on the environmental conditions such as temperature. With the change of coordination number, catalyst functions differ. Therefore, in the Step (VI), where the boron trifluoride and the complexing agent each recovered are utilized, the complex must be prepared again so that they can have the coordination number that can show the required catalytic functions.

By the above operations, it is possible to use the boron trifluoride complex catalyst specified in coordination number again in the step for polymerizing polybutene.

BRIEF DESCRIPTION OF DRAWING

FIG. 1 is a graph showing the results of measuring $^{13}$C-NMR spectrum on a boron trifluoride diethyl ether complex before the use in reaction and after use and recovery.

BEST METHOD FOR CARRYING OUT THE INVENTION

In the following, the present invention will be described in more detail with examples.

The measurement of boron trifluoride gas desorbed in the present examples was carried out according to the following method of analysis that is well known in the relevant industrial field.

<Method of Measuring Boron Trifluoride Gas Desorbed>

When boron trifluoride or its complex is reacted with an aqueous solution of calcium chloride, 3 moles of hydrochloric acid and 1 mole of boric acid are produced from 1 mole of boron trifluoride according to the following formula [12]. By conducting a neutralization titration of the produced hydrogen chloride with an alkali aqueous solution having a predetermined normality of sodium hydroxide or potassium hydroxide, the concentration of existing fluorine can be determined.

Furthermore, in accordance with the method of determining content of boric acid (Japanese Industrial Standard: JIS K 8863-1991), the concentration of existing boron can be determined by measuring the boric acid produced according to the following formula [12]. This is a method that utilizes the fact that boric acid and mannitol form a strongly acidic aqueous complex. By conducting neutralization titration of the produced strongly acidic complex with an alkali aqueous solution having a predetermined normality, the content of boric acid can be determined, from which the concentration of existing boron is determined.

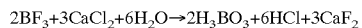
$$2BF_3+3CaCl_2+6H_2O \rightarrow 2H_3BO_3+6HCl+3CaF_2 \qquad [12]$$

The specific method of measuring boron trifluoride used in the present invention is as follows.

In the first place, boron trifluoride in a fluid containing boron trifluoride or its complex is adsorbed by lithium fluoride to form lithium tetrafluoroborate, then the above adsorbed salt is heated and the liberated boron trifluoride is absorbed in a solution containing water, a lower alcohol, diethyl ether or the like. Then, into the absorption liquid is added an aqueous solution of calcium chloride, and the above neutralization titration comprising 2 steps is carried out to determine the contents of fluorine and boron. Thus, the atomic molar ratio of both elements and the concentration of boron trifluoride are obtained.

Through the above method, it was confirmed that the liberated gas obtained from the examples of the present invention has the atomic molar ratio of fluorine to boron of 3:1 in every case. In other words, it was confirmed that the form of boron trifluoride ($BF_3$) was maintained.

<Production of Boron Trifluoride Complex Catalyst>

Boron trifluoride (purity: 99.7%) was blown into complexing agent kept below 0° C., with suppressing temperature rise until the required molar coordination ratio reached the required value to form a complex catalyst. The complex is liable to decompose, which is not indicated particularly, it was prepared and preserved below the temperature of decomposition, and used for reaction.

<Specifications of Polymerization Apparatus>

As the apparatus for polymerization, a 1-liter pressure-resistant vessel was used, which is provided with a nitrogen introducing pipe, a stirring device, a boron trifluoride gas cylinder, a gas blow-in pipe, a thermometer and a low-temperature cooling vessel. Commercially available reagents were used for all the added metal fluorides.

EXAMPLE 1

(Adsorption and Separation of Boron Trifluoride)

Under nitrogen current, Erlenmeyer flask equipped with a stirrer was fed with 100 g of hexane dispersion containing boron trifluoride diethyl etherate (0.25% by weight as boron trifluoride). Maintaining stirring at constant temperature of 25° C., 1.91 g of lithium fluoride (corresponding to 20 times as much as the mole of boron trifluoride) of guaranty reagent (purity: 99% or higher, made by Soekawa Chemical Co., Ltd.) was added. Then, stirring was continued for 30 minutes under the supply of nitrogen gas.

By stopping the stirrer and allowing the dispersion to stand still, the adsorbent and the organic liquid phase were separated into 2 phases with the difference in specific gravity. The organic phase was taken out and put into another vessel by decantation. A solution of calcium chloride was added into the above organic phase and the concentration of boron trifluoride remaining in the organic phase was measured by analysis utilizing the reaction shown in the above formula [12]. As a result, it was confirmed that the concentration of remaining boron trifluoride was zero. It was, therefore, understood that boron trifluoride was adsorbed and removed completely.

Next, the adsorbent was filtered off, dried under reduced pressure and examined concerning the change in weight. As the result of evaluation of the difference between the weights before and after the adsorption, it was found that the amount of boron trifluoride held by adsorption in the added lithium fluoride was 13.1 g/100 g-lithium fluoride.

Furthermore, the composition of organic phase separated by decantation was analyzed by gas chromatography. As a result, it was found that all the amount of diethyl ether corresponding to the amount of added boron trifluoride diethyl etherate complex was moved into the organic phase.

Moreover, the lithium fluoride as adsorbent holding boron trifluoride adsorbed was dried and analyzed by X-ray diffraction. As a result, two kinds of crystal structures corresponding to lithium fluoride (LiF) and lithium tetrafluoroborate (LiBF$_4$) were confirmed.

(Desorption by Heating)

A pipe-vessel made of stainless steel was packed with lithium fluoride as adsorbent containing adsorbed boron trifluoride, and it was supplied with nitrogen at a flow rate of 1 ml/minute (standard state). The heating of supplied nitrogen was begun to maintain the temperature at 270° C. The nitrogen flowing out of the exit was introduced into a previously cooled solution of diethyl ether.

Under these conditions, the nitrogen from the exit was observed, and the introduction of the heated nitrogen was continued until white smoke of boron trifluoride could not be observed in the exit gas. Then, after cooling, the remaining powder of adsorbent was weighed. As a result, the amount of residual boron trifluoride was zero, from which it was confirmed that 100% of the adsorbed boron trifluoride was desorbed. Furthermore, the remaining powder was analyzed by X-ray diffraction in the same way as in the adsorption. As a result, only the crystal structure of lithium fluoride was observed, and it was confirmed that the adsorbent was restored to the original form.

Moreover, an aqueous solution of calcium chloride was added into the solution of diethyl ether absorbing the gas that was desorbed by heating, and the above neutralization titration comprising 2 steps was carried out to determine the contents of fluorine and boron. The atomic molar ratio of fluorine and boron was calculated from the obtained values, and the amount of existing boron trifluoride was determined at the same time. As a result, the atomic molar ratio of fluorine against boron was 3:1, from which the form of boron trifluoride was confirmed. The amount of boron trifluoride in the solution of diethyl ether was found to be 0.24 g. Consequently, it could be confirmed that the amount corresponding to 96% of the boron trifluoride introduced in adsorption could be recovered in the reusable form of boron trifluoride.

The above results will be shown in Table 1.

EXAMPLE 2

(Adsorption and Removal of Boron Trifluoride)

A pipe-vessel made of stainless steel of 20 mm in diameter and 200 mm in length was packed with 18.00 g (694 mmol) of the lithium fluoride used in Example 1. The above pipe was maintained at a constant temperature of 25° C., and it was supplied with a dispersion of boron trifluoride diethyl etherate in hexane (0.25% by weight as boron trifluoride) in the like manner as in Example 1. The constant flow rate of 10 ml/hr (16.5 mg/hr as boron trifluoride) was maintained. The concentration of boron trifluoride in the exit fluid was zero, by which it was confirmed that boron trifluoride was completely adsorbed and removed.

The operation of adsorption was further continued, and after 120 hours from the start of supply of the above dispersion, the supply of dispersion was stopped at the time when a trace of boron trifluoride was detected in the exit fluid. After the stop of the supply of dispersion, the packed pipe was supplied with nitrogen to remove the contained organic medium by drying, and then the packed pipe was weighed. As the result of measuring the difference between the above weight and the weight measured before the supply of boron trifluoride solution, the amount of boron trifluoride adsorbed and held in the packed lithium fluoride was 11.0 g/100 g-lithium fluoride.

Further, the air-dried adsorbent having adsorbed boron trifluoride was analyzed by X-ray diffraction, and two kinds of crystal structures corresponding to lithium fluoride and lithium tetrafluoroborate were confirmed in the same way as in Example 1.

(Desorption by Heating)

The pipe packed with the lithium fluoride having adsorbed boron trifluoride as above was supplied with nitrogen in a flow rate of 1 ml/minute (standard state). The heating of packed pipe was begun to maintain the temperature of 270° C. The nitrogen taken from the exit was introduced into a solution of previously cooled diethyl ether.

Under these conditions, the nitrogen flowing out from the exit was observed, and the heating of the packed pipe and the introduction of nitrogen were continued until a white smoke of boron trifluoride could be hardly seen in the exit gas. Then, after cooling, the packed pipe was weighed. As a result, the amount of residual boron trifluoride was 0.1 g/100 g-lithium fluoride, which confirmed that 99.1% of the adsorbed boron trifluoride was desorbed.

Moreover, into the solution of diethyl ether having absorbed the gas desorbed by heating was added an aqueous solution of calcium chloride, then the contents of fluorine and boron were determined in the same way as in Example 1. As a result, it was confirmed that both elements formed the form of boron trifluoride and the amount of boron trifluoride present in the solution of diethyl ether was 1.88 g. Consequently, it could be confirmed that the amount corresponding to 95% of the boron trifluoride introduced in adsorption could be recovered in the reusable form of boron trifluoride.

EXAMPLE 3

For boron trifluoride diethyl etherate used in Example 1 was substituted a boron trifluoride phenolate complex. Experiments of adsorption and desorption of boron trifluoride were carried out in the same way as in Example 1, except that a dispersion (0.25% by weight as boron trifluoride) having boron trifluoride phenolate dispersed in hexane was used. The results will be shown in Table 1.

EXAMPLE 4

For boron trifluoride diethyl etherate used in Example 1 was substituted a boron trifluoride ethyl alcohol complex. Experiments of adsorption and desorption of boron trifluoride were carried out in the same way as in Example 1, except that a dispersion (0.25% by weight as boron trifluoride) having boron trifluoride ethyl alcohol complex dispersed in hexane was used. The results will be shown in Table 1.

EXAMPLE 5

In the conditions of Example 1, only the temperature of desorption by heating of 270° C. was changed for 400° C., and the adsorption and desorption of boron fluoride was carried out. The results will be shown in Table 1.

TABLE 1

| | Amount of BF$_3$ | | | Recovery of BF$_3$ (%) |
|---|---|---|---|---|
| | Supplied (g) | Adsorbed (g/100 g-LiF) | Desorbed by Heating (g) | |
| Ex. 1 | 0.250 | 13.1 | 0.240 | 96 |
| Ex. 3 | 0.250 | 13.1 | 0.235 | 94 |
| Ex. 4 | 0.250 | 13.1 | 0.238 | 95 |
| Ex. 5 | 0.250 | 13.1 | 0.238 | 95 |

As to the above Example 3 to 5, adsorbents holding boron trifluoride adsorbed were analyzed by X-ray diffraction. As a result, two kinds of crystal structures corresponding to lithium fluoride and lithium tetrafluoroborate were confirmed in the same way as in Example 1. Further, it was confirmed that all the gases desorbed on heating the adsorption salts were kept in the form of boron trifluoride.

EXAMPLE 6

For the dispersion having boron trifluoride diethyl etherate dispersed in hexane used in Example 1, was used a reaction mixture (containing 0.25% by weight as boron trifluoride) which was obtained by polymerizing olefin components in a C$_9$ aromatic mixture with a catalyst of boron trifluoride phenol complex. Adsorption and desorption were carried out in the same way as in Example 1 except for the above. As a result, boron trifluoride could be separated and removed completely with the adsorbed amount being 13.1 g/100 g-lithium fluoride.

Further, by a treatment at high temperature of 270° C., 93% of the adsorbed boron trifluoride was recovered.

The above-mentioned olefin components in a C$_9$ aromatic mixture is a mixture of aromatic olefins having a carbon number of 9 such as α-methylstyrene, vinyltoluene and indene, which is produced as by-product in thermal cracking or catalytic cracking of lower hydrocarbons in petroleum such as naphtha and butane.

EXAMPLE 7

For the dispersion having boron trifluoride etherate dispersed in hexane used in Example 1, was used a reaction mixture (0.25% by weight as boron trifluoride) which was obtained by polymerizing olefin components in a C$_4$ mixture with a catalyst of boron trifluoride ethyl alcohol complex. Adsorption and desorption were carried out in the same way as in Example 1 except for the above, and boron trifluoride could be separated and removed completely with the adsorbed amount being 13.1 g/100 g-lithium fluoride.

Further, by a treatment at high temperature of 270° C., 96% of the adsorbed boron trifluoride was recovered.

The above-mentioned C$_4$ mixture is a C$_4$ raffinate containing isobutene (a residual substance remaining after the extraction of butadiene from a fraction of ethylene cracker), and the composition is as follows (% by weight).

| | |
|---|---|
| Isobutene | 50.9 |
| Butene-1 | 23.2 |
| cis-Butene-2 | 2.8 |
| trans-Butene-2 | 6.4 |
| Isobutane | 5.4 |
| n-Butane | 11.3 |
| Total | 100.0 |

EXAMPLE 8
(Adsorption of Boron Trifluoride)

Into a vessel of pipe like shape made of stainless steel used in Example 2 was packed 18.00 g (694 mmol) of the lithium fluoride used in Example 1. The above pipe was maintained in a constant temperature of 25° C., and through the pipe was passed the unreacted free boron trifluoride gas (concentration of boron trifluoride of 700 to 900 vol.ppm) discharged the in polymerization of olefin components in a C$_9$ aromatic mixture described in Example 6. The flow rate was 30 liter/hr (average flow rate of boron trifluoride of 73 mg/hr). The concentration of boron trifluoride in the exit fluid was zero, which confirmed that boron trifluoride was completely adsorbed and removed.

The operation of adsorption was further continued, and after 32 hours from the start of supply of the above discharge gas, the supply was stopped at the time when a trace of boron trifluoride was detected in the exit fluid. After the stop of the supply of discharge gas, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed lithium fluoride was 13.0 g/100 g-lithium fluoride.

The adsorption product obtained as above was subjected to desorption by heating in the same procedures as used in Example 2. As a result, 97% of the adsorbed boron trifluoride was recovered.

Comparative Example 1

Into a toluene solution containing 5% by weight of acrylonitrile were dissolved tert-butyl peroxide in 1% by weight to acrylonitrile and thiourea in 0.5% by weight to the same as polymerization initiator. In the obtained solution was soaked the active carbon having a particle size of 60 to 80 mesh which was previously dried at 150° C., and the mixture was heated at 100° C. for 2 hours to cause polymerization. After the heating was over, the product was washed by a toluene heated up to the boiling point to remove the unreacted acrylonitrile and lower grade polymers.

For lithium fluoride used in Example 1, was packed the same weight of the active carbon carrying the acrylonitrile polymer obtained as above. Adsorption of boron trifluoride was carried out in the same way as in Example 1 except for the above.

As the result of measuring, the amount of the adsorbed boron trifluoride was 2.6 g/100 g-active carbon, which confirmed that the efficiency of adsorption was low.

Comparative Example 2
(Adsorption of Boron Trifluoride)

For lithium fluoride used in Example 1, was added the same mole (4.29 g) of powdery potassium fluoride (corresponding to 20 times as much as the mole of the boron trifluoride supplied). Adsorption of boron trifluoride was carried out in the same way as in Example 1 except for the above. As a result, boron trifluoride was adsorbed in the rate of 0.9 g/100 g-potassium fluoride, which confirmed that the efficiency of adsorption was low.
(Desorption by Heating)

The potassium fluoride as adsorbent holding boron trifluoride partly adsorbed was heated for desorption in the same way as in Example 1. The temperature of heating was maintained at 270° C. in the beginning. However, a white smoke of boron trifluoride could be hardly seen in the exit.

Then, the temperature was increased slowly. At the time when a high temperature of about 700° C. was reached, a white smoke was detected in the exit.

Comparative Example 3
(Adsorption of Boron Trifluoride)

For lithium fluoride used in Example 1, was added the same weight (1.91 g) of silica gel. Adsorption of boron trifluoride was carried out in the same way as in Example 1 except for the above. As a result, boron trifluoride was adsorbed in the rate of 5.1 g/100 g-silica gel. However, the liberated boron trifluoride complex was detected in an organic phase, which confirmed that the efficiency of adsorption was low. Further, during adsorption, it was confirmed that the liberated HF gas was present in a gaseous space of the organic phase.

Further, the silica gel as adsorbent supposed to have adsorbed and held boron trifluoride was analyzed by an electron spectroscopy for chemical analysis (ESCA). As a result, it was confirmed that fluorine and boron were present in the adsorbent in the atomic molar ratio of 2:1, and the form of boron trifluoride was not maintained.

Consequently, it was supposed that silanol group (—SiOH) in silica gel reacted with boron trifluoride during adsorption and decomposed into —SiOBF$_2$ group and liberated HF gas, and it was confirmed that boron trifluoride was difficult to recover in the reusable form.

EXAMPLE 9
(Adsorption of Boron Trifluoride)

Under a nitrogen current, into an Erlenmeyer flask provided with a stirrer was put 100 g of dispersion containing boron trifluoride diethyl etherate dispersed in hexane (0.25% by weight as boron trifluoride). While stirring was maintained at a constant temperature of 25° C., 1.15 g (corresponding to 4 times as much as the mole of boron trifluoride) of a guaranty reagent of calcium fluoride (purity 98% or more, produced by Kishida Chemical Co., Ltd.) was added as adsorbent. Then, stirring was carried out for 30 minutes under a nitrogen current.

By stopping the stirrer and allowing the dispersion to stand still, the adsorbent and the organic liquid phase were separated into 2 phases owing to the difference of gravity, and the organic phase was taken out in another vessel by decantation. Into the above organic phase was added a solution of calcium chloride, and the concentration of boron trifluoride remaining in the organic phase was measured by the analysis using the reaction shown in the above formula [12]. As a result, it was confirmed that the concentration of boron trifluoride remaining was zero, therefore boron trifluoride was adsorbed and removed completely.

Next, the adsorbent was filtered off, dried under reduced pressure and examined on the change of weight. As the result of evaluating the difference between the weights before and after the adsorption, it was found out that the amount of boron trifluoride adsorbed and held in the calcium fluoride added was 21.7 g/100 g-calcium fluoride.

Further, the organic phase separated by decantation was analyzed on composition by gas chromatography. As a result, it was found out that all the amount of diethyl ether corresponding to the amount of boron trifluoride diethyl etherate complex added was moved into the organic phase.

Moreover, the calcium fluoride as adsorbent holding boron trifluoride adsorbed was dried and analyzed by X-ray diffraction. As a result, two kinds of crystal structures corresponding to calcium fluoride (CaF$_2$) and calcium tetrafluoroborate (Ca(BF$_4$)$_2$) were confirmed.
(Desorption by Heating)

A vessel of pipe like shape made of stainless steel was packed with the calcium fluoride as adsorbent holding boron trifluoride adsorbed, and supplied with nitrogen in a flow rate of 1 ml/minute (standard state). The supplied nitrogen began to be heated to maintain the temperature of 270° C. The nitrogen flowing out from the exit was introduced into a solution of diethyl ether previously cooled.

Under these conditions, the nitrogen flowing out from the exit was observed, and the introduction of the heated nitrogen was continued until a white smoke of boron trifluoride could not be seen in the exit gas. Then, after cooling, the remaining powder of adsorbent was weighed. As a result, the amount of residual boron trifluoride was zero, which confirmed that 100% of the adsorbed boron trifluoride was desorbed. Further, the remaining powder was analyzed by X-ray diffraction in the same way as in the adsorption. As a result, only the crystal structure of calcium fluoride was observed, and it was confirmed that the adsorbent was restored to the original form.

Moreover, into the solution of diethyl ether having absorbed the gas desorbed by heating was added an aqueous solution of calcium chloride, and the above neutralization titration comprising 2 steps was carried out to determine the contents of fluorine and boron. The atomic molar ratio of fluorine and boron was calculated from the obtained values, and the amount of boron trifluoride present was determined at the same time. As a result, the atomic molar ratio of fluorine against boron was 3:1, which confirmed the form of boron trifluoride. The amount of boron trifluoride present in the solution of diethyl ether was found out to be 0.24 g. Consequently, it could be confirmed that the amount corresponding to 96% of the boron trifluoride introduced in adsorption could be recovered in the reusable form of boron trifluoride.

The above results will be shown in Table 2.

EXAMPLE 10
(Adsorption of Boron Trifluoride)

A vessel of pipe like shape made of stainless steel having a diameter of 20 mm and a length of 200 mm was packed with 18.00 g (231 mmol) of the calcium fluoride used in Example 9. The above pipe was maintained in a constant temperature of 25° C., and it was supplied with a dispersion containing boron trifluoride diethyl etherate dispersed in hexane (0.25% by weight as boron trifluoride) in the same way as in Example 9. The constant flow rate of 10 ml/hr (16.5 mg/hr as boron trifluoride) was maintained. The concentration of boron trifluoride in the exit fluid was zero, which confirmed that boron trifluoride was completely adsorbed and removed.

The operation of adsorption was further continued, and after 240 hours from the start of supply of the above dispersion solution, the supply of dispersion solution was stopped at the time when a trace of boron trifluoride was detected in the exit fluid. After the stop of the supply of dispersion solution, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed calcium fluoride was 22.0 g/100 g-calcium fluoride.

Further, the adsorbent having the air-dried boron trifluoride adsorbed was analyzed by X-ray diffraction, and two kinds of crystal structures corresponding to calcium fluoride and calcium tetrafluoroborate were confirmed in the same way as in Example 9.

(Desorption by Heating)

The pipe packed with the calcium fluoride having boron trifluoride adsorbed as above was supplied with nitrogen in a flow rate of 1 ml/minute (standard state). The packed pipe began to be heated to maintain the temperature of 270° C. The nitrogen flowing out from the exit was introduced into a solution of diethyl ether previously cooled.

Under these conditions, the nitrogen flowing out from the exit was observed, and the heating of the packed pipe and the introduction of nitrogen were continued until a white smoke of boron trifluoride could be hardly seen in the exit gas. Then, after cooling, the packed pipe was weighed. As a result, the amount of residual boron trifluoride was 0.1 g/100 g-calcium fluoride, which confirmed that 99.5% of the adsorbed boron trifluoride was desorbed.

Moreover, into the solution of diethyl ether having absorbed the gas desorbed by heating was added an aqueous solution of calcium chloride, then the contents of fluorine and boron were determined in the same way as in Example 9. As a result, it was confirmed that both elements were in the form of boron trifluoride and the amount of boron trifluoride present in the solution of diethyl ether was 3.76 g. Consequently, it could be confirmed that the amount corresponding to 95% of the boron trifluoride introduced in adsorption could be recovered in the reusable form of boron trifluoride.

EXAMPLE 11

For boron trifluoride diethyl etherate used in Example 9 was substituted a boron trifluoride phenolate complex. Experiments of adsorption and desorption of boron trifluoride were carried out in the same way as in Example 9, except that a dispersion (0.25% by weight as boron trifluoride) having boron trifluoride phenolate dispersed in hexane was used. The results will be shown in Table 2.

EXAMPLE 12

For boron trifluoride diethyl etherate used in Example 9 was substituted a boron trifluoride ethyl alcohol complex. Experiments of adsorption and desorption of boron trifluoride were carried out in the same way as in Example 9, except that a dispersion (0.25% by weight as boron trifluoride) having boron trifluoride ethyl alcohol complex dispersed in hexane was used. The results will be shown in Table 2.

EXAMPLE 13

In the conditions of Example 9, only the temperature of desorption by heating of 270° C. was changed for 400° C., and the adsorption and desorption of boron fluoride was carried out. The results will be shown in Table 2.

TABLE 2

| | Amount of $BF_3$ | | | |
|---|---|---|---|---|
| | Supplied (g) | Adsorbed (g/100 g-$CaF_2$) | Desorbed by Heating (g) | Recovery of $BF_3$ (%) |
| Ex. 9 | 0.250 | 21.7 | 0.240 | 96 |
| Ex. 11 | 0.250 | 21.7 | 0.231 | 92 |
| Ex. 12 | 0.250 | 21.7 | 0.235 | 94 |
| Ex. 13 | 0.250 | 21.7 | 0.245 | 98 |

As to the above Example 11 to 13, adsorbents holding boron trifluoride adsorbed were analyzed by X-ray diffraction. As a result, two kinds of crystal structures corresponding to calcium fluoride and calcium tetrafluoroborate were confirmed in the same way as in Example 9. Further, it was confirmed that all the gases desorbed on heating the adsorption salts were kept in the form of boron trifluoride.

EXAMPLE 14

For the dispersion having boron trifluoride diethyl etherate dispersed in hexane used in Example 9, was used a reaction mixture (containing 0.25% by weight as boron trifluoride) which was obtained by polymerizing olefin components in a $C_9$ aromatic mixture with a catalyst of boron trifluoride phenol complex. Adsorption and desorption were carried out in the same way as in Example 9 except for the above. As a result, boron trifluoride could be separated and removed completely with the adsorbed amount being 21.7 g/100 g-calcium fluoride.

Further, by a treatment at high temperature of 270° C., 93% of the adsorbed boron trifluoride was recovered.

The above-mentioned olefin components in a $C_9$ aromatic mixture is a mixture of aromatic olefins having a carbon number of 9 such as α-methylstyrene, vinyltoluene and indene, which is produced as by-product in thermal cracking or catalytic cracking of lower hydrocarbons in petroleum such as naphtha and butane.

EXAMPLE 15

For the dispersion having boron trifluoride etherate dispersed in hexane used in Example 9, was used a reaction mixture (0.25% by weight as boron trifluoride) which was obtained by polymerizing olefin components in a $C_4$ mixture with a catalyst of boron trifluoride ethyl alcohol complex. Adsorption and desorption were carried out in the same way as in Example 9 except for the above, and boron trifluoride could be separated and removed completely with the adsorbed amount being 21.7 g/100 g-lithium fluoride.

Further, by a treatment at high temperature of 270° C., 96% of the adsorbed boron trifluoride was recovered.

The above-mentioned $C_4$ mixture is a $C_4$ raffinate containing isobutene (a residual substance remaining after the extraction of butadiene from a fraction of ethylene cracker), and the composition is as described in Example 7.

EXAMPLE 16

(Adsorption of Boron Trifluoride)

Into a vessel of pipe like shape made of stainless steel was packed 18.0 g (231 mmol) of the calcium fluoride used in Example 9. The above pipe was maintained in a constant temperature of 25° C., and through the pipe was passed the unreacted free boron trifluoride gas (concentration of boron trifluoride of 700 to 900 vol.ppm) discharged in the polymerization of olefin components in a $C_9$ aromatic mixture described in Example 14. The flow rate was 30 liter/hr (average flow rate of boron trifluoride of 73 mg/hr). The concentration of boron trifluoride in the exit fluid was zero, which confirmed that boron trifluoride was completely adsorbed and removed.

The operation of adsorption was further continued, and after 53 hours from the start of supply of the above discharge gas, the supply was stopped at the time when a trace of boron trifluoride was detected in the exit fluid. After the stop of the supply of discharge gas, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed calcium fluoride was 21.5 g/100 g-calcium fluoride.

The adsorption product obtained as above was subjected to desorption by heating in the same procedures as used in Example 2. As a result, 96% of the adsorbed boron trifluoride was recovered.

Comparative Example 4

For calcium fluoride used in Example 9, was packed the same weight of the active carbon carrying the acrylonitrile polymer obtained in Comparative Example 1. Adsorption of boron trifluoride was carried out in the same way as in Example 9 except for the above.

As the result of measuring, the amount of the adsorbed boron trifluoride was 2.6 g/100 g-active carbon, which confirmed that the efficiency of adsorption was low.

Comparative Example 5
(Adsorption of Boron Trifluoride)

For calcium fluoride used in Example 9, was added the same mole (0.86 g) of powdery potassium fluoride (corresponding to 4 times as much as the mole of the boron trifluoride supplied). Adsorption of boron trifluoride was carried out in the same way as in Example 9 except for the above. As a result, boron trifluoride was adsorbed in the rate of 4.7 g/100 g-potassium fluoride, which confirmed that the efficiency of adsorption was low.
(Desorption by Heating)

The potassium fluoride as adsorbent holding boron trifluoride partly adsorbed was heated for desorption in the same way as in Example 9. The temperature of heating was maintained at 270° C. in the beginning. However, a white smoke of boron trifluoride could be hardly seen in the exit.

Then, the temperature was increased slowly. At the time when a high temperature of about 700° C. was reached, a white smoke was detected in the exit.

Comparative Example 6
(Adsorption of Boron Trifluoride)

For calcium fluoride used in Example 9, was added the same weight (1.15 g) of silica gel. Adsorption of boron trifluoride was carried out in the same way as in Example 9 except for the above. As a result, boron trifluoride was adsorbed in the rate of 8.5 g/100 g-silica gel. However, the liberated boron trifluoride complex was detected in an organic phase, which confirmed that the efficiency of adsorption was low. Further, during adsorption, it was confirmed that the liberated HF gas was present in a gaseous space of the organic phase.

Further, the silica gel as adsorbent supposed to have adsorbed and held boron trifluoride was analyzed by an electron spectroscopy for chemical analysis (ESCA). As a result, it was confirmed that fluorine and boron were present in the adsorbent in the atomic molar ratio of 2:1, and the form of boron trifluoride was not maintained.

Consequently, it was supposed that silanol group (—SiOH) in silica gel reacted with boron trifluoride during adsorption and decomposed into —$SiOBF_2$ group and liberated HF gas, and it was confirmed that boron trifluoride was difficult to recover in the reusable form.

EXAMPLE 17
(Adsorption of Boron Trifluoride)

Under a nitrogen current, into an Erlenmeyer flask provided with a stirrer was put 100 g of dispersion containing boron trifluoride diethyl etherate dispersed in hexane (0.25% by weight as boron trifluoride). While stirring was maintained at a constant temperature of 50° C., 2.32 g (corresponding to 5 times as much as the mole of boron trifluoride) of a guaranty reagent of strontium fluoride (purity 99% or more, made by Soekawa Chemical Co., Ltd.) was added as adsorbent. Then, stirring was carried out for 30 minutes under nitrogen current.

By stopping the stirrer and allowing the dispersion to stand still, the adsorbent and the organic liquid phase were separated into 2 phases owing to the difference of gravity, and the organic phase was taken out in another vessel by decantation. Into the above organic phase was added a solution of calcium chloride, and the concentration of boron trifluoride remaining in the organic phase was measured by the analysis using the reaction shown in the above formula [12]. As a result, it was confirmed that the concentration of boron trifluoride remaining was zero, therefore boron trifluoride was adsorbed and removed completely.

Next, the adsorbent was filtered off, dried under reduced pressure and examined on the change of weight. As the result of evaluating the difference between the weights before and after the adsorption, it was found out that the amount of boron trifluoride adsorbed and held in the strontium fluoride added was 10.8 g/100 g-strontium fluoride.

Further, the organic phase separated by decantation was analyzed on composition by gas chromatography. As a result, it was found out that all the amount of diethyl ether corresponding to the amount of boron trifluoride diethyl etherate complex added was moved into the organic phase.

Moreover, the strontium fluoride as adsorbent holding boron trifluoride adsorbed was dried and analyzed by X-ray diffraction. As a result, two kinds of crystal structures corresponding to strontium fluoride ($SrF_2$) and strontium tetrafluoroborate ($Sr(BF_4)_2$) were confirmed.
(Desorption by Heating)

A vessel of pipe like shape made of stainless steel was packed with strontium fluoride as adsorbent holding boron trifluoride adsorbed, and supplied with nitrogen in a flow rate of 1 ml/minute (standard state). The supplied nitrogen began to be heated to maintain the temperature of 300° C. The nitrogen flowing out from the exit was introduced into a solution of diethyl ether previously cooled.

Under these conditions, the nitrogen flowing out from the exit was observed, and the introduction of the heated nitrogen was continued until a white smoke of boron trifluoride could not be seen in the exit gas. Then, after cooling, the remaining powder of adsorbent was weighed. As a result, the amount of residual boron trifluoride was zero, which confirmed that 100% of the adsorbed boron trifluoride was desorbed. Further, the remaining powder was analyzed by X-ray diffraction in the same way as in the adsorption. As a result, only the crystal structure of strontium fluoride was observed, and it was confirmed that the adsorbent was restored to the original form.

Moreover, into the solution of diethyl ether having absorbed the gas desorbed by heating was added an aqueous solution of calcium chloride, and the above neutralization titration comprising 2 steps was carried out to determine the contents of fluorine and boron. The atomic molar ratio of fluorine and boron was calculated from the obtained values, and the amount of boron trifluoride present was determined at the same time. As a result, the atomic molar ratio of fluorine against boron was 3:1, which confirmed the form of boron trifluoride. The amount of boron trifluoride present in the solution of diethyl ether was found out to be 0.238 g. Consequently, it could be confirmed that the amount corresponding to 95% of the boron trifluoride introduced in adsorption could be recovered in the reusable form of boron trifluoride.

The above results will be shown in Table 3.

EXAMPLE 18

(Adsorption of Boron Trifluoride)

A vessel of pipe like shape made of stainless steel having a diameter of 20 mm and a length of 200 mm was packed with 18.00 g (143 mmol) of the strontium fluoride used in Example 17. The above pipe was maintained in a constant temperature of 50° C., and it was supplied with a dispersion containing boron trifluoride diethyl etherate dispersed in hexane (0.25% by weight as boron trifluoride) in the same way as in Example 17. The constant flow rate of 10 ml/hr (16.5 mg/hr as boron trifluoride) was maintained. The concentration of boron trifluoride in the exit fluid was zero, which confirmed that boron trifluoride was completely adsorbed and removed.

The operation of adsorption was further continued, and after 116 hours from the start of supply of the above dispersion solution, the supply of dispersion solution was stopped at the time when a trace of boron trifluoride was detected in the exit fluid. After the stop of the supply of dispersion solution, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed strontium fluoride was 10.6 g/100 g-strontium fluoride.

Further, the adsorbent having the air-dried boron trifluoride adsorbed was analyzed by X-ray diffraction, and two kinds of crystal structures corresponding to strontium fluoride and strontium tetrafluoroborate were confirmed in the same way as in Example 17.

(Desorption by Heating)

The pipe packed with the strontium fluoride having boron trifluoride adsorbed as above was supplied with nitrogen in a flow rate of 1 ml/minute (standard state). The packed pipe began to be heated to maintain the temperature of 300° C. The nitrogen flowing out from the exit was introduced into a solution of diethyl ether previously cooled.

Under these conditions, the nitrogen flowing out from the exit was observed, and the heating of the packed pipe and the introduction of nitrogen were continued until a white smoke of boron trifluoride could be hardly seen in the exit gas. Then, after cooling, the packed pipe was weighed. As a result, the amount of residual boron trifluoride was 0.1 g/100 g-strontium fluoride, which confirmed that 99% of the adsorbed boron trifluoride was desorbed.

Moreover, into the solution of diethyl ether having absorbed the gas desorbed by heating was added an aqueous solution of calcium chloride, then the contents of fluorine and boron were determined in the same way as in Example 17. As a result, it was confirmed that both elements formed the form of boron trifluoride and the amount of boron trifluoride present in the solution of diethyl ether was 1.90 g. Consequently, it could be confirmed that the amount corresponding to 99% of the boron trifluoride introduced in adsorption could be recovered in the reusable form of boron trifluoride.

EXAMPLE 19

For boron trifluoride diethyl etherate used in Example 17 was substituted a boron trifluoride phenolate complex. Experiments of adsorption and desorption of boron trifluoride were carried out in the same way as in Example 17, except that a dispersion (0.25% by weight as boron trifluoride) having boron trifluoride phenolate dispersed in hexane was used. The results will be shown in Table 3.

EXAMPLE 20

For boron trifluoride diethyl etherate used in Example 17 was substituted a boron trifluoride ethyl alcohol complex. Experiments of adsorption and desorption of boron trifluoride were carried out in the same way as in Example 17, except that a dispersion (0.25% by weight as boron trifluoride) having boron trifluoride ethyl alcohol complex dispersed in hexane was used. The results will be shown in Table 3.

EXAMPLE 21

In the conditions of Example 17, only the temperature of desorption by heating of 300° C. was changed for 400° C., and the adsorption and desorption of boron fluoride was carried out. The results will be shown in Table 3.

TABLE 3

| | Amount of $BF_3$ | | | |
| --- | --- | --- | --- | --- |
| | Supplied (g) | Adsorbed (g/100 g-$SrF_2$) | Desorbed by Heating (g) | Recovery of $BF_3$ (%) |
| Ex. 17 | 0.250 | 10.8 | 0.238 | 95 |
| Ex. 19 | 0.250 | 10.8 | 0.230 | 92 |
| Ex. 20 | 0.250 | 10.8 | 0.236 | 94 |
| Ex. 21 | 0.250 | 10.8 | 0.238 | 95 |

As to the above Example 19 to 21, adsorbents holding boron trifluoride adsorbed were analyzed by X-ray diffraction. As a result, two kinds of crystal structures corresponding to strontium fluoride and strontium tetrafluoroborate were confirmed in the same way as in Example 17. Further, it was confirmed that all the gases desorbed on heating the adsorption salts were kept in the form of boron trifluoride.

EXAMPLE 22

For the dispersion having boron trifluoride diethyl etherate dispersed in hexane used in Example 17, was used a reaction mixture (containing 0.25% by weight as boron trifluoride) which was obtained by polymerizing olefin components in a $C_9$ aromatic mixture with a catalyst of boron trifluoride phenol complex. Adsorption and desorption were carried out in the same way as in Example 17 except for the above. As a result, boron trifluoride could be separated and removed completely with the adsorbed amount being 10.7 g/100 g-strontium fluoride.

Further, by a treatment at high temperature of 300° C., 93% of the adsorbed boron trifluoride was recovered.

The above-mentioned olefin components in a $C_9$ aromatic mixture is a mixture of aromatic olefins having a carbon number of 9 such as α-methylstyrene, vinyltoluene and indene, which is produced as by-product in thermal cracking or catalytic cracking of lower hydrocarbons in petroleum such as naphtha and butane.

EXAMPLE 23

For the dispersion having boron trifluoride etherate dispersed in hexane used in Example 17, was used a reaction mixture (0.25% by weight as boron trifluoride) which was obtained by polymerizing olefin components in a $C_4$ mixture with a catalyst of boron trifluoride ethyl alcohol complex. Adsorption and desorption were carried out in the same way as in Example 17 except for the above, and boron trifluoride could be separated and removed completely with the adsorbed amount being 10.8 g/100 g-strontium fluoride.

Further, by a treatment at high temperature of 300° C., 96% of the adsorbed boron trifluoride was recovered.

The above-mentioned $C_4$ mixture is a $C_4$ raffinate containing isobutene (a residual substance remaining after the extraction of butadiene from a fraction of ethylene cracker), and the composition is as described in Example 7.

EXAMPLE 24
(Adsorption of Boron Trifluoride)

Into a vessel of pipe like shape made of stainless steel used in Example 18 was packed 18.00 g (143 mmol) of the strontium fluoride used in Example 17. The above pipe was maintained in a constant temperature of 50° C., and through the pipe was passed the unreacted free boron trifluoride gas (concentration of boron trifluoride of 700 to 900 vol.ppm) discharged the in polymerization of olefin components in a $C_9$ aromatic mixture described in Example 22. The flow rate was 30 liter/hr (average flow rate of boron trifluoride of 73 mg/hr). The concentration of boron trifluoride in the exit fluid was zero, which confirmed that boron trifluoride was completely adsorbed and removed.

The operation of adsorption was further continued, and after 26 hours from the start of supply of the above discharge gas, the supply was stopped at the time when a trace of boron trifluoride was detected in the exit fluid. After the stop of the supply of discharge gas, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed strontium fluoride was 10.5 g/100 g-strontium fluoride.

The adsorption product obtained as above was subjected to desorption by heating in the same procedures as used in Example 18. As a result, 97% of the adsorbed boron trifluoride was recovered.

Comparative Example 7

For strontium fluoride used in Example 17, was packed the same weight of the active carbon carrying the acrylonitrile polymer obtained in Comparative Example 1. Adsorption of boron trifluoride was carried out in the same way as in Example 17 except for the above.

As the result of measuring, the amount of the adsorbed boron trifluoride was 2.6 g/100 g-active carbon, which confirmed that the efficiency of adsorption was low.

Comparative Example 8
(Adsorption of Boron Trifluoride)

For strontium fluoride used in Example 17, was added the same mole (1.07 g) of powdery potassium fluoride (corresponding to 5 times as much as the mole of the boron trifluoride supplied). Adsorption of boron trifluoride was carried out in the same way as in Example 17 except for the above. As a result, boron trifluoride was adsorbed in the rate of 3.8 g/100 g-potassium fluoride, which confirmed that the efficiency of adsorption was low.
(Desorption by Heating)

The potassium fluoride as adsorbent holding boron trifluoride partly adsorbed was heated for desorption in the same way as in Example 17. The temperature of heating was maintained at 300° C. in the beginning. However, a white smoke of boron trifluoride could be hardly seen in the exit.

Then, the temperature was increased slowly. At the time when a high temperature of about 700° C. was reached, a white smoke was detected in the exit.

Comparative Example 9
(Adsorption of Boron Trifluoride)

For strontium fluoride used in Example 17, was added the same weight (2.32 g) of silica gel. Adsorption of boron trifluoride was carried out in the same way as in Example 17 except for the above. As a result, boron trifluoride was adsorbed in the rate of 4.2 g/100 g-silica gel. However, the liberated boron trifluoride complex was detected in an organic phase, which confirmed that the efficiency of adsorption was low. Further, during adsorption, it was confirmed that the liberated HF gas was present in a gaseous space of the organic phase.

Further, the silica gel as adsorbent supposed to have adsorbed and held boron trifluoride was analyzed by an electron spectroscopy for chemical analysis (ESCA). As a result, it was confirmed that fluorine and boron were present in the adsorbent in the atomic molar ratio of 2:1, and the form of boron trifluoride was not maintained.

Consequently, it was supposed that silanol group (—SiOH) in silica gel reacted with boron trifluoride during adsorption and decomposed into —$SiOBF_2$ group and liberated HF gas, and it was confirmed that boron trifluoride was difficult to recover in the reusable form.

EXAMPLE 25
(Adsorption of Boron Trifluoride)

Under a nitrogen current, into an Erlenmeyer flask provided with a stirrer was put 100 g of a dispersion containing boron trifluoride diethyl etherate dispersed in hexane (0.25% by weight as boron trifluoride). While stirring was maintained at a constant temperature of 50° C., 3.23 g (corresponding to 5 times as much as the mole of boron trifluoride) of a guaranty reagent of barium fluoride (purity 99% or more, made by Soekawa Chemical Co., Ltd.) was added. Then, stirring was carried out for 30 minutes under nitrogen current.

By stopping the stirrer and allowing the dispersion to stand still, the adsorbent and the organic liquid phase were separated into 2 phases owing to the difference of gravity, and the organic phase was taken out in another vessel by decantation. Into the above organic phase was added a solution of calcium chloride, and the concentration of boron trifluoride remaining in the organic phase was measured by the analysis using the reaction shown in the above formula [12]. As a result, it was confirmed that the concentration of boron trifluoride remaining was zero, therefore boron trifluoride was adsorbed and removed completely.

Next, the adsorbent was filtered off, dried under reduced pressure and examined on the change of weight. As the result of evaluating the difference between the weights before and after the adsorption, it was found out that the amount of boron trifluoride adsorbed and held in the barium fluoride added was 7.7 g/100 g-barium fluoride.

Further, the organic phase separated by decantation was analyzed on composition by gas chromatography. As a result, it was found out that all the amount of diethyl ether corresponding to the amount of boron trifluoride diethyl etherate complex added was moved into the organic phase.

Moreover, the barium fluoride as adsorbent holding boron trifluoride adsorbed was dried and analyzed by X-ray diffraction. As a result, two kinds of crystal structures corresponding to barium fluoride ($BaF_2$) and barium tetrafluoroborate ($Ba(BF_4)_2$) were confirmed.

(Desorption by Heating)

A vessel of pipe like shape made of stainless steel was packed with barium fluoride as adsorbent holding boron trifluoride adsorbed, and supplied with nitrogen in a flow rate of 1 ml/minute (standard state). The supplied nitrogen began to be heated to maintain the temperature of 300° C. The nitrogen flowing out from the exit was introduced into a solution of diethyl ether previously cooled.

Under these conditions, the nitrogen flowing out from the exit was observed, and the introduction of the heated nitrogen was continued until a white smoke of boron trifluoride could not be seen in the exit gas. Then, after cooling, the remaining powder of adsorbent was weighed. As a result, the amount of residual boron trifluoride was zero, which confirmed that 100% of the adsorbed boron trifluoride was desorbed. Further, the remaining powder was analyzed by X-ray diffraction in the same way as in the adsorption. As a result, only the crystal structure of lithium fluoride was observed, and it was confirmed that the adsorbent was restored to the original form.

Moreover, into the solution of diethyl ether having absorbed the gas desorbed by heating was added an aqueous solution of calcium chloride, and the above neutralization titration comprising 2 steps was carried out to determine the contents of fluorine and boron. The atomic molar ratio of fluorine and boron was calculated from the obtained values, and the amount of boron trifluoride present was determined at the same time. As a result, the atomic molar ratio of fluorine against boron was 3:1, which confirmed the form of boron trifluoride. The amount of boron trifluoride present in the solution of diethyl ether was found out to be 0.240 g. Consequently, it could be confirmed that the amount corresponding to 96% of the boron trifluoride introduced in adsorption could be recovered in the reusable form of boron trifluoride.

The above results will be shown in Table 4.

EXAMPLE 26

(Adsorption of Boron Trifluoride)

A vessel of pipe like shape made of stainless steel having a diameter of 20 mm and a length of 200 mm was packed with 18.00 g (103 mmol) of the barium fluoride used in Example 25. The above pipe was maintained in a constant temperature of 50° C., and it was supplied with a dispersion containing boron trifluoride diethyl etherate dispersed in hexane (0.25% by weight as boron trifluoride) in the same way as in Example 25. The constant flow rate of 10 ml/hr (16.5 mg/hr as boron trifluoride) was maintained. The concentration of boron trifluoride in the exit fluid was zero, which confirmed that boron trifluoride was completely adsorbed and removed.

The operation of adsorption was further continued, and after 84 hours from the start of supply of the above dispersion solution, the supply of dispersion solution was stopped at the time when a trace of boron trifluoride was detected in the exit fluid. After the stop of the supply of dispersion solution, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed barium fluoride was 7.7 g/100 g-barium fluoride.

Further, the adsorbent having the air-dried boron trifluoride adsorbed was analyzed by X-ray diffraction, and two kinds of crystal structures corresponding to barium fluoride and barium tetrafluoroborate were confirmed in the same way as in Example 25.

(Desorption by Heating)

The pipe packed with the barium fluoride having boron trifluoride adsorbed as above was supplied with nitrogen in a flow rate of 1 ml/minute (standard state). The packed pipe began to be heated to maintain the temperature of 300° C. The nitrogen flowing out from the exit was introduced into a solution of diethyl ether previously cooled.

Under these conditions, the nitrogen flowing out from the exit was observed, and the heating of the packed pipe and the introduction of nitrogen were continued until a white smoke of boron trifluoride could be hardly seen in the exit gas. Then, after cooling, the packed pipe was weighed. As a result, the amount of residual boron trifluoride was 0.1 g/100 g-barium fluoride, which confirmed that 99% of the adsorbed boron trifluoride was desorbed.

Moreover, into the solution of diethyl ether having absorbed the gas desorbed by heating was added an aqueous solution of calcium chloride, then the contents of fluorine and boron were determined in the same way as in Example 25. As a result, it was confirmed that both elements formed the form of boron trifluoride and the amount of boron trifluoride present in the solution of diethyl ether was 1.330 g. Consequently, it could be confirmed that the amount corresponding to 96% of the boron trifluoride introduced in adsorption could be recovered in the reusable form of boron trifluoride.

EXAMPLE 27

For boron trifluoride diethyl etherate used in Example 25 was substituted a boron trifluoride phenolate complex. Experiments of adsorption and desorption of boron trifluoride were carried out in the same way as in Example 25, except that a dispersion (0.25% by weight as boron trifluoride) having boron trifluoride phenolate dispersed in hexane was used. The results will be shown in Table 4.

EXAMPLE 28

For boron trifluoride diethyl etherate used in Example 25 was substituted a boron trifluoride ethyl alcohol complex. Experiments of adsorption and desorption of boron trifluoride were carried out in the same way as in Example 25, except that a dispersion (0.25% by weight as boron trifluoride) having boron trifluoride ethyl alcohol complex dispersed in hexane was used. The results will be shown in Table 4.

EXAMPLE 29

In the conditions of Example 25, only the temperature of desorption by heating of 300° C. was changed for 400° C., and the adsorption and desorption of boron fluoride was carried out. The results will be shown in Table 4.

TABLE 4

| | Amount of $BF_3$ | | | |
|---|---|---|---|---|
| | Supplied (g) | Adsorbed (g/100 g-$BaF_2$) | Desorbed by Heating (g) | Recovery of $BF_3$ (%) |
| Ex. 25 | 0.250 | 7.7 | 0.240 | 96 |
| Ex. 27 | 0.250 | 7.7 | 0.233 | 93 |
| Ex. 28 | 0.250 | 7.7 | 0.236 | 94 |
| Ex. 29 | 0.250 | 7.7 | 0.241 | 96 |

As to the above Example 27 to 29, adsorbents holding boron trifluoride adsorbed were analyzed by X-ray diffraction. As a result, two kinds of crystal structures corresponding to barium fluoride and barium tetrafluoroborate were confirmed in the same way as in Example 25. Further, it was confirmed that all the gases desorbed on heating the adsorption salts were kept in the form of boron trifluoride.

EXAMPLE 30

For the dispersion having boron trifluoride diethyl etherate dispersed in hexane used in Example 25, was used a reaction mixture (containing 0.25% by weight as boron trifluoride) which was obtained by polymerizing olefin components in a $C_9$ aromatic mixture with a catalyst of boron trifluoride phenol complex. Adsorption and desorption were carried out in the same way as in Example 25 except for the above. As a result, boron trifluoride could be separated and removed completely with the adsorbed amount being 7.7 g/100 g-barium fluoride.

Further, by a treatment at high temperature of 300° C., 95% of the adsorbed boron trifluoride was recovered.

The above-mentioned olefin components in a $C_9$ aromatic mixture is a mixture of aromatic olefins having a carbon number of 9 such as α-methylstyrene, vinyltoluene and indene, which is produced as by-product in thermal cracking or catalytic cracking of lower hydrocarbons in petroleum such as naphtha and butane.

EXAMPLE 31

For the dispersion having boron trifluoride etherate dispersed in hexane used in Example 25, was used a reaction mixture (0.25% by weight as boron trifluoride) which was obtained by polymerizing olefin components in a $C_4$ mixture with a catalyst of boron trifluoride ethyl alcohol complex. Adsorption and desorption were carried out in the same way as in Example 25 except for the above, and boron trifluoride could be separated and removed completely with the adsorbed amount being 7.8 g/100 g-barium fluoride.

Further, by a treatment at high temperature of 300° C., 96% of the adsorbed boron trifluoride was recovered.

The above-mentioned $C_4$ mixture is a $C_4$ raffinate containing isobutene (a residual substance remaining after the extraction of butadiene from a fraction of ethylene cracker), and the composition is as described in Example 7.

EXAMPLE 32
(Adsorption of Boron Trifluoride)

Into a vessel of pipe like shape made of stainless steel used in Example 26 was packed 18.00 g (103 mmol) of the barium fluoride used in Example 25. The above pipe was maintained in a constant temperature of 50° C., and through the pipe was passed the unreacted free boron trifluoride gas (concentration of boron trifluoride of 700 to 900 vol.ppm) discharged the in polymerization of olefin components in a $C_9$ aromatic mixture described in Example 30. The flow rate was 30 liter/hr (average flow rate of boron trifluoride of 73 mg/hr). The concentration of boron trifluoride in the exit fluid was zero, which confirmed that boron trifluoride was completely adsorbed and removed.

The operation of adsorption was further continued, and after 19 hours from the start of supply of the above discharge gas, the supply was stopped at the time when a trace of boron trifluoride was detected in the exit fluid. After the stop of the supply of discharge gas, the packed pipe was supplied with nitrogen to remove the attached organic liquid by drying, and then the packed pipe was weighed. As the result of measuring the difference between the above weight and the weight measured before the supply of solution of boron trifluoride, the amount of boron trifluoride adsorbed and held in the packed barium fluoride was 7.7 g/100 g-barium fluoride.

The adsorption product obtained as above was subjected to desorption by heating in the same procedures as used in Example 2. As a result, 97% of the adsorbed boron trifluoride was recovered.

Comparative Example 10

For barium fluoride used in Example 25, was packed the same weight of the active carbon carrying the acrylonitrile polymer obtained in Comparative Example 1. Adsorption of boron trifluoride was carried out in the same way as in Example 25 except for the above.

As the result of measuring, the amount of the adsorbed boron trifluoride was 2.6 g/100 g-active carbon, which confirmed that the efficiency of adsorption was low.

Comparative Example 11
(Adsorption of Boron Trifluoride)

For barium fluoride used in Example 25, was added the same weight (3.23 g) of silica gel. Adsorption of boron trifluoride was carried out in the same way as in Example 25 except for the above. As a result, boron trifluoride was adsorbed in the rate of 3.0 g/100 g-silica gel. However, the liberated boron trifluoride complex was detected in an organic phase, which confirmed that the efficiency of adsorption was low. Further, during adsorption, it was confirmed that the liberated HF gas was present in a gaseous space of the organic phase.

Further, the silica gel as adsorbent supposed to have adsorbed and held boron trifluoride was analyzed by an electron spectroscopy for chemical analysis (ESCA). As a result, it was confirmed that fluorine and boron were present in the adsorbent in the atomic molar ratio of 2:1, and the form of boron trifluoride was not maintained.

Consequently, it was supposed that silanol group (—SiOH) in silica gel reacted with boron trifluoride during adsorption to cause decomposition into —$SiOBF_2$ group and liberated HF gas, and it was confirmed that boron trifluoride was difficult to recover in the reusable form.

EXAMPLE 33
(Polymerization for Polyisobutene)

Under a nitrogen current, 100 g of a guaranty reagent of isooctane as dilution solvent was put into the above-mentioned vessel. While the temperature was maintained at −25° C. with stirring, 100 g of pure isobutene was added. Then, 2.09 g of boron trifluoride diethyl ether complex (1:1 mole adduct) was put into the mixture and polymerization was carried out for 30 minutes with vigorous stirring.
(Adsorption of Boron Trifluoride)

After the reaction was over, into the reaction mixture having boron trifluoride diethyl etherate dispersed was added 4.59 g (correspondent to 4 times as much as the mole of boron trifluoride) of calcium fluoride (purity 98% or more), while stirring was maintained at a constant temperature of 25° C. Then, stirring was carried out for 30 minutes.

When the stirrer was stopped and the dispersion was allowed to stand still, the adsorbent and the reaction mixture were separated into 2 phases owing to the difference of gravity. The reaction mixture phase was taken out in another vessel, and the concentration of boron trifluoride remaining in the reaction mixture was measured by the analysis described according to the above formula [12]. As a result, it was confirmed that the concentration of boron trifluoride was zero, therefore boron trifluoride was adsorbed and remove completely. Further, the reaction mixture was analyzed by gas chromatography. As a result, all the amount of diethyl ether corresponding to the amount of boron trifluoride diethyl etherate complex added was detected.

Further, in a distillation of the reaction mixture under reduced pressure, isooctane and lower components were distilled away, then the conversion rate of isobutene participating in polymerization and the yield of the polyisobutene produced were obtained.

Next, the adsorbent was filtered off, dried under reduced pressure and examined on the change of weight. As the result of evaluating the difference between the weights before and after the adsorption, it was found out that the amount of boron trifluoride adsorbed and held in the calcium fluoride added was 21.7 g/100 g-calcium fluoride.

Moreover, the calcium fluoride as adsorbent holding dried boron trifluoride adsorbed was analyzed by X-ray diffraction. As a result, two kinds of crystal structures corresponding to calcium fluoride ($CaF_2$) and calcium tetrafluoroborate ($Ca(BF_4)_2$) were confirmed.

(Desorption by Heating)

A vessel of pipe like shape made of stainless steel was packed with calcium fluoride as adsorbent holding boron trifluoride adsorbed, and supplied with nitrogen in a flow rate of 1 ml/minute (standard state). The supplied nitrogen began to be heated to maintain the temperature of 270° C. The nitrogen flowing out from the exit was introduced into a solution of the diethyl ether recovered by distillation after adsorption of boron trifluoride.

Under these conditions, the nitrogen flowing out from the exit was observed, and the introduction of the heated nitrogen was continued until a white smoke of boron trifluoride could not be seen in the exit gas. Then, after cooling, the remaining powder of adsorbent was weighed. As a result, the amount of residual boron trifluoride was zero, which confirmed that 100% of the adsorbed boron trifluoride was desorbed. Further, the remaining powder was analyzed by X-ray diffraction in the same way as in the adsorption. As a result, only the crystal structure of calcium fluoride was observed, and it was confirmed that the adsorbent was restored to the original form.

Moreover, as to the solution of diethyl ether having absorbed the gas desorbed by heating, the above neutralization titration comprising 2 steps was carried out to determine the contents of fluorine and boron. The atomic molar ratio of fluorine and boron was calculated from the obtained values, and the amount of boron trifluoride present was determined at the same time. As a result, the atomic molar ratio of fluorine against boron was 3:1, which confirmed the form of boron trifluoride ($BF_3$). It was found out that 2.05 g of boron trifluoride diethyl ether complex catalyst was reproduced. After all, it was confirmed that boron trifluoride diethyl ether complex catalyst introduced in polymerization could be recovered in a high rate of 98% or more in the form of reusable complex, even after the treatment of adsorption and desorption.

Further, a boron trifluoride complex catalyst was analyzed by $^{13}$C-NMR. FIG. 1 is a graph showing the results of measuring $^{13}$C-NMR spectrum on the boron trifluoride diethyl ether complex before reaction and after recovery. The numbers on the abscissa indicate the chemical shifts in ppm from the peak of tetramethylsilane (TMS) as internal standard substance. In the measurement by $^{13}$C-NMR on boron trifluoride diethyl ether complex coordinated in a molar ratio of 1.0:1.0, two peaks at 12.9 ppm and 69.9 ppm are detected, which originate from the carbon of diethyl ether. The two peaks shift according to the molar ratio. When the measurement of $^{13}$C-NMR is carried out on the boron trifluoride diethyl ether complex reproduced, peaks can be observed at the same positions as those in the case of the fresh complex catalyst. Therefore, it is confirmed that the catalyst keeps the same molar ratio as that of the catalyst before the reaction.

(Recovery of Complex Catalyst)

Into the vessel for polymerization was put 100 g of isooctane as dilution solvent again. While the temperature was maintained at −25° C. with stirring, 100 g of isobutene was newly added in the vessel. Then, the boron trifluoride diethyl ether complex reproduced was put in the vessel to carry out polymerization.

After the reaction was over, 4.59 g of calcium fluoride (corresponding to 4 times as much as the mole of boron trifluoride) was added, then stirring was carried out for 30 minutes. After the adsorption, similar procedures were carried out to obtain the conversion rate and the yield. Procedures such as the distillation of reaction mixture and the desorption of adsorbent by heating were carried out in the same conditions as in the first operation.

The above procedure for recovering boron trifluoride was repeated 3 times and polymerization was carried out 4 times successively. The conversion rate of isobutene, the yield of polyisobutene and the ratio of the amount of the recovered complex catalyst against that of the supplied one (recovery) in the first and the fourth reactions are shown in Table 5.

TABLE 5

| Reaction No. | Conversion Rate of Isobutene (mole %) | Yield of Polyisobutene (% by weight) | Recovery of Complex Catalyst (%) |
|---|---|---|---|
| 1 | 98.0 | 94.7 | 98.5 |
| 4 | 97.7 | 93.8 | 98.2 |

EXAMPLE 34

Polymerization was carried out in the same way as in Example 33, and strontium fluoride was substituted for calcium fluoride as adsorbent added after the end of reaction.

More precisely, 7.39 g of strontium fluoride (corresponding to 4 times as much as the mole of boron trifluoride) was added after the reaction was over and the adsorption was carried out in the same way as in Example 33. After the adsorption, the same procedures were carried out in the same way as in Example 33 to obtain the conversion rate of isobutene and the yield of polybutene produced.

The distillation procedures of the reaction mixture afterwards were carried out in the same conditions as in Example 33. As the temperature for desorbing boron trifluoride from adsorbent by heating, 320° C. was substituted for 270° C.

The above operation recovering boron trifluoride was repeated three times, and four successive polymerization operations were carried out. The conversion rate of isobutene, the yield of polyisobutene and the recovery of complex catalyst in the first and the fourth reactions are shown in Table 6.

TABLE 6

| Reaction No. | Conversion Rate of Isobutene (mole %) | Yield of Polyisobutene (% by weight) | Recovery of Complex Catalyst (%) |
|---|---|---|---|
| 1 | 97.5 | 94.1 | 65.3 |
| 4 | 97.8 | 94.8 | 63.9 |

EXAMPLE 35

Polymerization was carried out in the same way as in Example 33, and the amount of strontium fluoride added after the end of reaction was changed.

More precisely, 14.80 g of strontium fluoride (corresponding to 8 times as much as the mole of boron trifluoride) was added and the adsorption was carried out in the same way as in Example 33.

The distillation procedures of the reaction mixture and the desorption of boron trifluoride from adsorbent by heating afterwards were carried out in the same way as in Example 34.

The above operation recovering boron trifluoride was repeated three times, and four successive polymerization operations were carried out. The conversion rate of isobutene, the yield of polyisobutene and the recovery of complex catalyst in the first and the fourth reactions are shown in Table 7.

TABLE 7

| Reaction No. | Conversion Rate of Isobutene (mole %) | Yield of Polyisobutene (% by weight) | Recovery of Complex Catalyst (%) |
|---|---|---|---|
| 1 | 97.9 | 94.1 | 98.3 |
| 4 | 98.0 | 94.0 | 97.1 |

EXAMPLE 36

As complex catalyst, 1.69 g of boron trifluoride ethanol complex (1:1 mole adduct) was added, and polymerization was carried out in the same way as in Example 33.

After the end of the reaction, 4.59 g of calcium fluoride (correspondent to 4 times as much as the mole of boron trifluoride) was added in the same way as in Example 33, and adsorption was carried out with stirring for 30 minutes. After the adsorption, the distillation procedures of the reaction mixture and the desorption of boron trifluoride from adsorbent by heating were carried out in the same way as in Example 33. Using the recovered ethanol and boron trifluoride, the boron trifluoride ethanol complex was prepared again.

The above operation of recovering boron trifluoride was repeated three times, and four successive polymerization operations were carried out. The conversion rate of isobutene, the yield of polyisobutene and the recovery of complex catalyst in the first and the fourth reactions are shown in Table 8.

TABLE 8

| Reaction No. | Conversion Rate of Isobutene (mole %) | Yield of Polyisobutene (% by weight) | Recovery of Complex Catalyst (%) |
|---|---|---|---|
| 1 | 98.2 | 95.1 | 98.5 |
| 4 | 98.1 | 95.0 | 97.4 |

EXAMPLE 37

Using isobutane as solvent, polymerization of isobutene was carried out in the same way as in Example 33. More precisely, 200.0 g of the isobutane diluted with isobutane was put in a flask. While the temperature was maintained at −25° C., 1.64 g of boron trifluoride diethyl ether complex (1:1 mole adduct) was added into the flask and polymerization was carried out for 30 minutes with vigorous stirring.

After the reaction was over, 4.59 g of calcium fluoride (correspondent to 5 times as much as the mole of boron trifluoride) was added in the same way as in Example 33, and stirring was carried out for 30 minutes to carry out adsorption. After the adsorption, the operation recovering boron trifluoride was repeated three times, and four successive polymerization operations were carried out, in the same way as in Example 1. The conversion rate of isobutene, the yield of polyisobutene and the recovery of complex catalyst in the first and the fourth reactions are shown in Table 9.

TABLE 9

| Reaction No. | Conversion Rate of Isobutene (mole %) | Yield of Polyisobutene (% by weight) | Recovery of Complex Catalyst (%) |
|---|---|---|---|
| 1 | 98.2 | 95.1 | 97.9 |
| 4 | 98.1 | 95.2 | 98.1 |

Comparative Example 12 to 16

In Comparative Example 12 to 16, polymerization was carried out in the same condition as in the first polymerization of Example 33 to 37, respectively. However, metal fluoride was not added in the reaction mixtures. As a result, when the reaction mixture was allowed to stand still after the reaction with the temperature being maintained, the boron trifluoride complex catalyst was kept dispersed in the reaction liquid containing polyisobutene in all cases. Separation by settling was not caused as it was.

<Comparative Example 17

For calcium fluoride used in Example 33, was packed the same weight of the active carbon carrying the acrylonitrile polymer obtained in Comparative Example 1. Adsorption of boron trifluoride was carried out in the same way as in Example 33 except for the above.

As the result of measuring, the adsorption rate of boron trifluoride was 2.6 g/100 g-active carbon, which confirmed that the efficiency of adsorption was low.

Comparative Example 18
(Adsorption of Boron Trifluoride)

For calcium fluoride used in Example 33, was added 3.43 g of powdery potassium fluoride (corresponding to 4 times as much as the mole of the supplied boron trifluoride). Adsorption of boron trifluoride was carried out in the same way as in Example 33 except for the above. As a result, boron trifluoride was adsorbed in the rate of 4.7 g/100 g-potassium fluoride, which confirmed that the efficiency of adsorption was low.

(Desorption by Heating)

The potassium fluoride as adsorbent holding boron trifluoride partly adsorbed was heated for desorption in the same way as in Example 33. The temperature of heating was maintained at 270° C. in the beginning. However, a white smoke of boron trifluoride could be hardly seen in the exit.

Then, the temperature was increased slowly. At the time when a high temperature of about 700° C. was reached, a white smoke was detected in the exit.

Comparative Example 19

(Adsorption of Boron Trifluoride)

For calcium fluoride used in Example 33, was added the same weight (4.59 g) of silica gel. Adsorption of boron trifluoride was carried out in the same way as in Example 33 except for the above. As a result, boron trifluoride was adsorbed in the rate of 8.5 g/100 g-silica gel. However, the liberated boron trifluoride complex was detected in an organic phase, which confirmed that the efficiency of adsorption was low. Further, during adsorption, it was confirmed that the liberated HF gas was present in a gaseous space of the organic phase.

Further, the silica gel as adsorbent supposed to have adsorbed and held boron trifluoride was analyzed by an electron spectroscopy for chemical analysis (ESCA). As a result, it was confirmed that fluorine and boron were present in the adsorbent in the atomic molar ratio of 2:1, and the form of boron trifluoride was not maintained.

Consequently, it was supposed that silanol group (—SiOH) in silica gel reacted with boron trifluoride during adsorption and decomposed into —SiOBF$_2$ group and liberated HF gas, and it was confirmed that boron trifluoride was difficult to recover in the reusable form.

The above result coincides with that obtained in Comparable Example 6.

EXAMPLE 38

(Polymerization for Olefin Oligomer)

Under a nitrogen current, 150 g of a guaranty reagent of 1-decene and 2.51 g (the amount of boron trifluoride in the complex: 1.20 g) of boron trifluoride n-butanol complex (1:1 mole adduct) were put into the above-mentioned vessel. The temperature was maintained at +25° C. with stirring in the vessel. While 0.30 g of boron trifluoride gas was blown into the vessel, polymerization was started. Polymerization was continued for 4 hours while being cooled to keep 25° C. After all, the amount of boron trifluoride in the complex required for the reaction was 1.50 g.

(Adsorption of Boron Trifluoride)

After the reaction over 4 hours, into the reaction mixture having boron trifluoride-n-butanol complex dispersed was added 8.63 g of calcium fluoride (correspondent to 5 times as much as the mole of boron trifluoride) while stirring was maintained at a constant temperature of 25° C. Then, stirring was carried out for 30 minutes.

When the stirrer was stopped and the dispersion was allowed to stand still, the adsorbent and the reaction mixture were separated into 2 phases owing to the difference of gravity. The reaction mixture phase was taken out in another vessel, and the concentration of boron trifluoride remaining in the reaction mixture was measured by the analysis described according to the above formula [12]. As a result, it was confirmed that the concentration of boron trifluoride was zero, therefore boron trifluoride was adsorbed and remove completely. Further, the reaction mixture was analyzed by gas chromatography. As a result, all the amount of n-butanol corresponding to the amount of boron trifluoride n-butanol complex added was detected. The compositions of the reaction liquid containing oligomer before and after the adsorption were analyzed by gas chromatography.

Further, in a distillation of the reaction mixture, unreacted olefins and oligomers of low molecular weight having carbon number of 20 or lower were distilled away, then the conversion rate of 1-decene participating in polymerization and the yield of the olefin oligomer produced were obtained.

Next, the adsorbent was filtered off, dried under reduced pressure and examined on the change of weight. As the result of evaluating the difference between the weights before and after the adsorption, it was found out that the amount of boron trifluoride adsorbed and held in the calcium fluoride added was 17.3 g/100 g-calcium fluoride.

Moreover, the calcium fluoride as adsorbent holding dried boron trifluoride adsorbed was analyzed by X-ray diffraction. As a result, two kinds of crystal structures corresponding to calcium fluoride (CaF$_2$) and calcium tetrafluoroborate (Ca(BF$_4$)$_2$) were confirmed.

(Desorption by Heating)

A vessel of pipe like shape made of stainless steel separately prepared was packed with calcium fluoride as adsorbent holding boron trifluoride adsorbed, and supplied with nitrogen in a flow rate of 1 ml/minute (standard state). The supplied nitrogen began to be heated to maintain the temperature of 270° C. The nitrogen flowing out from the exit was introduced into a solution of the n-butanol recovered by distillation after adsorption of boron trifluoride.

Under these conditions, the nitrogen flowing out from the exit was observed, and the introduction of the heated nitrogen was continued until a white smoke of boron trifluoride could not be seen in the exit gas. Then, after cooling, the remaining powder of adsorbent was weighed. As a result, the amount of residual boron trifluoride was zero, which confirmed that 100% of the adsorbed boron trifluoride was desorbed. Further, the remaining powder was analyzed by X-ray diffraction in the same way as in the adsorption. As a result, only the crystal structure of calcium fluoride (CaF$_2$) was observed, and it was confirmed that the adsorbent was restored to the original form.

Moreover, as to the solution of n-butanol having absorbed the gas desorbed by heating, the above neutralization titration comprising 2 steps was carried out to determine the contents of fluorine and boron. The atomic molar ratio of fluorine and boron was calculated from the obtained values, and the amount of boron trifluoride present was determined at the same time. As a result, the atomic molar ratio of fluorine against boron was 3:1, which confirmed the form of boron trifluoride (BF$_3$). It was found out that 1.49 g of boron trifluoride was contained in the solution of n-butanol. After all, 3.12 g of boron trifluoride n-butanol complex catalyst was reproduced. Consequently, it was confirmed that boron trifluoride n-butanol complex catalyst introduced in polymerization could be recovered in a high rate of 98% or more in the form of reusable complex, even after the adsorption and desorption of boron trifluoride.

Further, a boron trifluoride n-butanol complex catalyst was analyzed by $^{13}$C-NMR. The results of measuring $^{13}$C-NMR spectrum were compared on the boron trifluoride n-butanol complex catalyst before reaction and after recovery. As a result, in the spectrum of boron trifluoride n-butanol complex catalyst reproduced after use, the peaks were observed at the same positions as those in the case of the fresh complex catalyst. Therefore, it was confirmed that the catalyst kept the same molar ratio as that of the catalyst before the reaction.

(Recovery of Complex Catalyst)

Into the vessel for polymerization was put 150 g of a guaranty reagent of 1-decene and 2.51 g of boron trifluoride n-butanol complex (the amount of boron trifluoride in the complex: 1.20 g) again. The temperature was maintained at +25° C. with stirring in the vessel. While 0.30 g of boron trifluoride gas was blown into the vessel, polymerization was started. Polymerization was continued for 4 hours while being cooled to keep 25° C.

After the reaction was over, 8.63 g of calcium fluoride (corresponding to 5 times as much as the mole of boron trifluoride) was added, then stirring was carried out for 30 minutes. After the adsorption, procedures similar to those in the first operation were carried out to obtain the conversion rate, the yield of olefin oligomer produced and the compositions of the product. Procedures such as the distillation of reaction mixture and the desorption of adsorbent by heating were carried out in the same conditions as in the first operation.

The above procedure for recovering boron trifluoride was repeated 3 times and polymerization was carried out 4 times successively. The conversion rate of 1-decene, the yield of olefin oligomer and the ratio of the amount of the recovered complex catalyst against that of the supplied one (recovery) in the first and the fourth reactions are shown in Table 10. The composition of the oligomer product before the adsorption and after in the first reaction are shown in Table 11.

TABLE 10

| Reaction No. | Conversion Rate of 1-Decene (mole %) | Yield of Oligomer (% by weight) | Recovery of Complex Catalyst (%) |
|---|---|---|---|
| 1 | 98.9 | 93.7 | 98.5 |
| 4 | 98.7 | 93.8 | 98.2 |

TABLE 11

| Composition of Oligomer Product (%) | | | |
|---|---|---|---|
| | $C_{20}$ | $C_{30}$ | $C_{40}$ or higher |
| Before Adsorption | 5.0 | 58.1 | 36.9 |
| After Adsorption | 5.0 | 58.1 | 36.9 |

EXAMPLE 39

Polymerization was carried out in the same way as in Example 38, and strontium fluoride was substituted for calcium fluoride as adsorbent added after the end of reaction.

More precisely, 13.89 g of strontium fluoride (corresponding to 5 times as much as the mole of boron trifluoride) was added after the reaction was over and the adsorption was carried out in the same way as in Example 38. After the adsorption, the same procedures were carried out in the same way as in Example 38 to obtain the conversion rate of 1-decene and the yield of olefin oligomer produced.

The distillation procedures of the reaction mixture afterwards were carried out in the same conditions as in Example 38. As the temperature for desorbing boron trifluoride from adsorbent by heating, 320° C. was substituted for 270° C.

The above operation of recovering boron trifluoride was repeated three times, and four successive polymerization operations were carried out. The conversion rate of 1-decene, the yield of oligomer and the recovery of complex catalyst in the first and the fourth reactions are shown in Table 12.

TABLE 12

| Reaction No. | Conversion Rate of 1-Decene (mole %) | Yield of Oligomer (% by weight) | Recovery of Complex Catalyst (%) |
|---|---|---|---|
| 1 | 98.5 | 94.1 | 65.3 |
| 4 | 98.8 | 94.8 | 63.9 |

EXAMPLE 40

Polymerization was carried out in the same way as in Example 38, and the amount of strontium fluoride added after the end of reaction was changed.

More precisely, 27.79 g of strontium fluoride (corresponding to 10 times as much as the mole of boron trifluoride) was added and the adsorption was carried out in the same way as in Example 38.

The distillation procedures of the reaction mixture and the desorption of boron trifluoride from adsorbent by heating afterwards were carried out in the same way as in Example 39.

The above operation of recovering boron trifluoride was repeated three times, and four successive polymerization operations were carried out. The conversion rate of 1-decene, the yield of oligomer and the recovery of complex catalyst in the first and the fourth reactions are shown in Table 13.

TABLE 13

| Reaction No. | Conversion Rate of 1-Decene (mole %) | Yield of Oligomer (% by weight) | Recovery of Complex Catalyst (%) |
|---|---|---|---|
| 1 | 98.9 | 94.1 | 98.3 |
| 4 | 98.0 | 94.0 | 98.1 |

EXAMPLE 41

For boron trifluoride n-butanol complex as complex catalyst was substituted 1.77 g (the amount of boron trifluoride in the complex: 1.20 g) of boron trifluoride methanol complex (1:1 mole adduct). Polymerization was carried out in the same way as in Example 38 except for the above.

After the end of the reaction, 5.53 g of calcium fluoride (corresponding to 4 times as much as the mole of boron trifluoride) was added in the same way as in Example 1, and adsorption was carried out with stirring for 30 minutes. After the adsorption, the distillation procedures of the reaction mixture and the desorption of boron trifluoride from adsorbent by heating were carried out in the same way as in Example 38. Using the recovered methanol and boron trifluoride, the boron trifluoride methanol complex was prepared again.

The above operation of recovering boron trifluoride was repeated three times, and four successive polymerization operations were carried out. The conversion rate of 1-decene, the yield of oligomer and the recovery of complex catalyst in the first and the fourth reactions are shown in Table 14.

TABLE 14

| Reaction No. | Conversion Rate of 1-Decene (mole %) | Yield of Oligomer (% by weight) | Recovery of Complex Catalyst (%) |
|---|---|---|---|
| 1 | 99.2 | 95.1 | 98.5 |
| 4 | 99.1 | 95.0 | 98.4 |

Comparative Example 20 to 23

In Comparative Example 20 to 23, polymerization was carried out in the same condition as in the first polymerization of Example 38 to 41, respectively. However, metal fluoride was not added in the reaction mixtures. As a result, when the reaction mixture was allowed to stand still after the reaction with the temperature being maintained, the boron trifluoride complex catalyst was kept dispersed in the reaction liquid containing olefin oligomer in all cases. Separation by settling was not caused as it was.

Comparative Example 24

For calcium fluoride used in Example 38, was packed the same weight of the active carbon carrying the acrylonitrile polymer obtained in Comparative Example 1. Adsorption of boron trifluoride was carried out in the same way as in Example 38 except for the above.

As the result of measuring, the efficiency of adsorption of boron trifluoride was 2.6 g/100 g-active carbon, which confirmed that the efficiency of adsorption was low.

Comparative Example 25
(Adsorption of Boron Trifluoride)

For calcium fluoride used in Example 38, was added the same mole (6.43 g) of powdery potassium fluoride (corresponding to 5 times as much as the mole of the boron trifluoride supplied). Adsorption of boron trifluoride was carried out in the same way as in Example 38 except for the above. As a result, boron trifluoride was adsorbed in the efficiency of 3.8 g/100 g-potassium fluoride, which confirmed that the efficiency of adsorption was low.
(Desorption by Heating)

The potassium fluoride as adsorbent holding boron trifluoride partly adsorbed was heated for desorption in the same way as in Example 38. The temperature of heating was maintained at 270° C. in the beginning. However, a white smoke of boron trifluoride could be hardly seen in the exit.

Then, the temperature was increased slowly. At the time when a high temperature of about 700° C. was reached, a white smoke was detected in the exit.

Comparative Example 26
(Adsorption of Boron Trifluoride)

For calcium fluoride used in Example 38, was added the same weight (8.63 g) of silica gel. Adsorption of boron trifluoride was carried out in the same way as in Example 38 except for the above. As a result, boron trifluoride was adsorbed in the efficiency of 6.8 g/100 g-silica gel. However, the liberated boron trifluoride complex was detected in an organic phase, which confirmed that the efficiency of adsorption was low. Further, during adsorption, it was confirmed that the liberated HF gas was present in a gaseous space of the organic phase.

Further, the silica gel as adsorbent supposed to have adsorbed and held boron trifluoride was analyzed by an electron spectroscopy for chemical analysis (ESCA). As a result, it was confirmed that fluorine and boron were present in the adsorbent in the atomic molar ratio of 2:1, and the form of boron trifluoride was not maintained.

Consequently, it was supposed that silanol group (—SiOH) in silica gel reacted with boron trifluoride during adsorption and decomposed into —SiOBF$_2$ group and liberated HF gas, and it was confirmed that boron trifluoride was difficult to recover in the reusable form.

INDUSTRIAL APPLICABILITY

According to the present invention, it is possible to adsorb and separate selectively the boron trifluoride contained in a fluid at high efficiency, by using metal fluoride as adsorbent. Furthermore, it is also possible to desorb and recover highly pure boron trifluoride efficiently and reuse it as occasion demands.

Furthermore, the above method can be applied to the production of polyolefin such as polybutene and olefin oligomers by polymerizing $C_4$ olefin and $C_5$ or higher olefins, respectively. In these cases, it is possible to recover boron trifluoride complex catalyst comprising boron trifluoride and complexing agent from the polymer products at high efficiency and to use them repeatedly without deterioration of its activity, thereby contributing to the reduction of costs for catalyst in production.

When used catalyst is separated and removed in conventional polymerization processes, catalyst must be neutralized with aqueous solution of basic substance such as ammonia or caustic soda and it is removed by washing with water. In such a process, a large quantity of waste water containing used alkali and fluorides as neutralization products of boron trifluoride is discarded from the washing process. According to the present invention, it is possible to reduce largely the problems in environmental pollution caused by the treatment of industrial waste with recovering catalyst at high efficiency.

What is claimed is:

1. A method for removing boron trifluoride, which method comprises bringing a fluid containing boron trifluoride or a boron trifluoride complex into contact with a metal fluoride as represented by the following formula [1], thereby adsorbing selectively boron trifluoride or boron trifluoride in said complex by said metal fluoride, $$MF_n \qquad [1]$$

wherein M is a metal atom selected from the group consisting of calcium, strontium, and barium and n is 2.

2. A method for removing boron trifluoride as claimed in claim 1, wherein the temperature of said contact is 100° C. or below.

3. A method for removing boron trifluoride as claimed in claim 1, wherein said boron trifluoride complex comprises boron trifluoride and an organic or inorganic polar compound.

4. A method for removing boron trifluoride as claimed in claim 3, wherein said organic or inorganic polar compound is one member selected from the group consisting of oxygen-containing compounds, nitrogen-containing compounds, sulfur-containing compounds, phosphorus-containing compounds, and inorganic acids.

5. A method for removing boron trifluoride as claimed in claim 4, wherein said oxygen-containing compound is one member selected from the group consisting of water, alcohols, ethers, phenols, ketones, aldehydes, esters, organic acids and acid anhydrides.

6. A method for recovering boron trifluoride, comprising:

(Step 1): bringing a fluid containing boron trifluoride or a boron trifluoride complex into contact with a metal fluoride as represented by the following formula [1], thereby causing the metal fluoride to adsorb selectively said boron trifluoride or boron trifluoride in said complex to form metal tetrafluoroborate as represented by the following formula [2], $$MF_n \qquad [1]$$

$$M(BF_4)_n \qquad [2]$$

wherein M is a metal atom selected from the group consisting of calcium, strontium, and barium and n is 2, and (Step 2): heating said metal tetrafluoroborate formed in said Step 1 in the temperature range of 100 to 600° C. to obtain boron trifluoride and metal fluoride.

7. A method for recovering boron trifluoride as claimed in claim 6, wherein the temperature of heating said metal tetrafluoroborate in said Step 2 is 500° C. or below.

8. A method for removing boron trifluoride, comprising: bringing a fluid containing boron trifluoride or a boron trifluoride complex into contact with a metal fluoride as represented by the following formula [1], thereby adsorbing selectively boron trifluoride or boron trifluoride in said complex by said metal fluoride, $$MF_n \qquad [1]$$

wherein M is a metal atom selected from the group consisting of lithium, calcium, strontium, and barium and n is 1 or 2; and recovering the boron trifluoride in a temperature range of 100 to 600° C.

* * * * *